(12) United States Patent
Moore et al.

(10) Patent No.: US 12,555,078 B2
(45) Date of Patent: Feb. 17, 2026

(54) SYSTEMS AND METHODS FOR INCORPORATING CALENDAR FUNCTIONALITY INTO ELECTRONIC MESSAGES

(71) Applicant: Baydin, Inc., Santa Clara, CA (US)

(72) Inventors: Alexander Moore, Santa Clara, CA (US); Michael Chin, Santa Clara, CA (US); Aye Moah, Santa Clara, CA (US); Alexey Komissarouk, Santa Clara, CA (US)

(73) Assignee: Baydin, Inc., Santa Clara, CA (US)

( * ) Notice: Subject to any disclaimer, the term of this patent is extended or adjusted under 35 U.S.C. 154(b) by 0 days.

(21) Appl. No.: 18/629,022

(22) Filed: Apr. 8, 2024

(65) Prior Publication Data

US 2025/0005534 A1    Jan. 2, 2025

Related U.S. Application Data

(63) Continuation of application No. 17/731,096, filed on Apr. 27, 2022, now Pat. No. 11,954,649, which is a
(Continued)

(51) Int. Cl.
*G06Q 10/10*    (2023.01)
*G06Q 10/107*    (2023.01)
(Continued)

(52) U.S. Cl.
CPC ......... *G06Q 10/1093* (2013.01); *G06Q 10/10* (2013.01); *G06Q 10/107* (2013.01); *G06F 3/0482* (2013.01)

(58) Field of Classification Search
None
See application file for complete search history.

(56) References Cited

U.S. PATENT DOCUMENTS 5,428,784 A * 6/1995 Cahill, Jr. ............ G06Q 10/107
708/112
6,457,045 B1    9/2002 Hanson et al.
(Continued)

FOREIGN PATENT DOCUMENTS

EP              1727082 A1 * 11/2006 ........... G06Q 10/109
WO    WO-9923579 A1 *  5/1999 ............. G06Q 10/10
(Continued)

OTHER PUBLICATIONS

"Outlook Group Calendar Solutions" Outlookipedia, 2008, <http://www.outlookipedia.com/Outlook/group-calendar.aspx> (Year: 2008), (7 pages).
(Continued)

*Primary Examiner* — Romain Jeanty
(74) *Attorney, Agent, or Firm* — Foley & Lardner LLP

(57) ABSTRACT

A system is provided which that allows users of electronic communication systems and/or calendar systems the ability to suggest meetings to users of different electronic communication systems and/or calendar systems via electronic messages. The system may provide users with the ability to share calendar availability with users of other electronic communication systems and/or calendar systems via electronic message. One aspect of the disclosed system is the fact that users can share interactive calendar information, and propose and confirm tentative meetings and events, with users of different electronic communications and/or calendar systems. Additionally, calendar information that is shared with others may be dynamically updated even after the electronic messages have been sent.

21 Claims, 27 Drawing Sheets

Related U.S. Application Data continuation of application No. 15/969,699, filed on May 2, 2018, now Pat. No. 11,321,674, which is a continuation of application No. 14/299,710, filed on Jun. 9, 2014, now Pat. No. 9,990,611, which is a continuation-in-part of application No. 14/198,791, filed on Mar. 6, 2014, now abandoned.

(60) Provisional application No. 61/775,429, filed on Mar. 8, 2013.

(51) Int. Cl.
  *G06Q 10/1093* (2023.01)
  *G06F 3/0482* (2013.01)

(56) References Cited

U.S. PATENT DOCUMENTS

| | | | |
|---|---|---|---|
| 6,581,050 | B1 | 6/2003 | Horvitz et al. |
| 6,604,079 | B1 | 8/2003 | Ruvolo et al. |
| 6,978,246 | B1 * | 12/2005 | Ruvolo .............. G06Q 10/1093 705/7.19 |
| 7,788,248 | B2 | 8/2010 | Forstall et al. |
| 8,060,567 | B2 * | 11/2011 | Carroll .................. G06F 3/0481 709/206 |
| 8,065,175 | B1 | 11/2011 | Lewis |
| 8,830,182 | B1 | 9/2014 | Alakuijala |
| 9,264,391 | B2 | 2/2016 | Castera et al. |
| 9,462,570 | B1 | 10/2016 | Bostick et al. |
| 10,120,859 | B2 | 11/2018 | Parikh et al. |
| 2001/0054072 | A1 * | 12/2001 | Discolo ................ G06Q 10/109 709/204 |
| 2003/0004773 | A1 | 1/2003 | Clark et al. |
| 2003/0130882 | A1 | 7/2003 | Shuttleworth et al. |
| 2004/0015479 | A1 | 1/2004 | Meek et al. |
| 2004/0215479 | A1 | 10/2004 | Dorsey et al. |
| 2005/0091674 | A1 | 4/2005 | Knight et al. |
| 2005/0102245 | A1 | 5/2005 | Edlund et al. |
| 2005/0198124 | A1 | 9/2005 | McCarthy |
| 2006/0010206 | A1 | 1/2006 | Apacible et al. |
| 2006/0168346 | A1 | 7/2006 | Chen et al. |
| 2006/0200374 | A1 | 9/2006 | Nelken |
| 2006/0265263 | A1 * | 11/2006 | Burns ................... G06Q 10/109 705/80 |
| 2007/0022167 | A1 | 1/2007 | Citron |
| 2007/0073810 | A1 * | 3/2007 | Adams ................. G06Q 10/107 709/205 |
| 2007/0244977 | A1 | 10/2007 | Atkins |
| 2007/0260523 | A1 | 11/2007 | Schadt et al. |
| 2008/0015922 | A1 | 1/2008 | Nelken |
| 2008/0034047 | A1 | 2/2008 | Rosenberg et al. |
| 2008/0071868 | A1 * | 3/2008 | Arenburg ............. G06Q 10/109 709/206 |
| 2008/0114636 | A1 * | 5/2008 | Nellutla .............. G06Q 10/1093 705/7.19 |
| 2009/0089377 | A1 | 4/2009 | Rubinger |
| 2009/0089389 | A1 | 4/2009 | Chen et al. |
| 2009/0100010 | A1 | 4/2009 | Dargahi et al. |
| 2009/0100347 | A1 | 4/2009 | Schemers et al. |
| 2009/0157466 | A1 | 6/2009 | Bank et al. |
| 2009/0235280 | A1 | 9/2009 | Tannier et al. |
| 2009/0248806 | A1 | 10/2009 | Teman |
| 2010/0088144 | A1 * | 4/2010 | Collet ................ G06Q 10/1093 705/7.18 |
| 2010/0159883 | A1 | 6/2010 | Pascal et al. |
| 2010/0179961 | A1 | 7/2010 | Berry et al. |
| 2010/0191566 | A1 | 7/2010 | Loring et al. |
| 2011/0106892 | A1 | 5/2011 | Nelson et al. |
| 2011/0125545 | A1 | 5/2011 | Lehmann et al. |
| 2011/0301966 | A1 | 12/2011 | Kartoun et al. |
| 2012/0011196 | A1 | 1/2012 | Green et al. |
| 2012/0042025 | A1 | 2/2012 | Jamison et al. |
| 2012/0143961 | A1 * | 6/2012 | Jonsson ............. G06Q 10/1093 709/206 |
| 2013/0159426 | A1 | 6/2013 | Milic-Frayling et al. |
| 2013/0174002 | A1 | 7/2013 | Jones et al. |
| 2013/0179501 | A1 * | 7/2013 | Murphy, Jr. ....... G06Q 10/1095 709/204 |
| 2014/0244734 | A1 | 8/2014 | Nutt et al. |
| 2017/0257329 | A1 | 9/2017 | Tetreault et al. |
| 2017/0322923 | A1 | 11/2017 | Dixon et al. |
| 2018/0191648 | A1 | 7/2018 | Mendes et al. |

FOREIGN PATENT DOCUMENTS

| | | | | |
|---|---|---|---|---|
| WO | WO-2007033465 A1 * | 3/2007 | ........... | G06Q 10/107 |
| WO | WO-2016/191396 A1 | 12/2016 | | |

OTHER PUBLICATIONS

"Save Time with an Outlook Calendar Tip—Drag and Drop" Cotria, Jun. 9, 2012, <http://www.cotria.com/free_advice/powerful_outlook_tip_calendar>, (Year: 2012) 1 page.

Final Office Action on U.S. Appl. No. 15/969,699 DTD Feb. 16, 2021.

Non-Final Office Action on U.S. Appl. No. 15/969,699 DTD Mar. 30, 2020.

Non-Final Office Action on U.S. Appl. No. 17/731,096 DTD Aug. 3, 2023.

Notice of Allowance on U.S. Appl. No. 17/731,096 DTD Dec. 12, 2023.

Office Action on U.S. Appl. No. 14/198,791 dated Sep. 15, 2016 (25 pages).

US Final Office Action on U.S. Appl. No. 14/299,710 dated Dec. 27, 2017 (19 pages).

US Notice of Allowance on U.S. Appl. No. 14/299,710 dated Apr. 6, 2018 (25 pages).

US Notice of Allowance on U.S. Appl. No. 15/969,699 DTD Jan. 5, 2022.

US Office Action on U.S. Appl. No. 14/299,710 dated Sep. 11, 2015 (20 pages).

US Office Action on U.S. Appl. No. 14/198,791 dated Dec. 28, 2017 (20 pages).

US Office Action on U.S. Appl. No. 14/198,791 dated May 23, 2017 (22 pages).

US Office Action on U.S. Appl. No. 14/198,791 DTD Aug. 23, 2018.

US Office Action on U.S. Appl. No. 14/299,710 dated Jan. 5, 2017 (25 pages).

US Office Action on U.S. Appl. No. 14/299,710 dated Jul. 29, 2016 (17 pages).

US Office Action on U.S. Appl. No. 14/299,710 dated Mar. 22, 2017 (18 pages).

US Office Action on U.S. Appl. No. 14/299,710 dated Mar. 18, 2016 (23 pages).

Woeltji, H., Seiwart, L., "How to Schedule Meetings So They are Convenient, Effective, and Fun". Microsoft Press Store, Sep. 26, 2011, <https://www.microsoftpressstore.com/articles/article.aspx?p=2225069&seqNum=4> (Year: 2011), (14 pages).

* cited by examiner

Project Review

Roger Jones

Project Review

Do any of these times work for you?

- Sunday, Feb 10, 12:30 PM - 2:00 PM PST (3:30 PM - 5:00 PM EST)
- Wednesday, Feb 13, 9:00 AM - 11:30 AM PST (12:00 PM - 2:30 PM EST)
- Thursday, Feb 14, 11:00 AM - 1:30 PM PST (2:00 PM - 4:30 PM EST)

We can meet via Skype Call.

Thanks,
Marty|

Send

Send Later ☐ Boomerang this [in 2 days ▼] [if no reply]

SYSTEMS AND METHODS FOR INCORPORATING CALENDAR FUNCTIONALITY INTO ELECTRONIC MESSAGES

RELATED APPLICATIONS

This application is a continuation of U.S. patent application Ser. No. 17/731,096 filed Apr. 27, 2022, which is a continuation of U.S. patent application Ser. No. 15/969,699 filed May 2, 2018, which is a continuation of U.S. patent application Ser. No. 14/299,710 filed Jun. 9, 2014, which is a continuation-in-part of U.S. patent application Ser. No. 14/198,791 filed Mar. 6, 2014, which claims the benefit of Provisional U.S. Patent Application No. 61/775,429 filed Mar. 8, 2013. The content of all these applications is incorporated herein by reference in its entirety.

BACKGROUND

Users of information technology increasingly use electronic calendar systems and applications to manage their appointments, meetings, events, and other scheduled activities through various forms of calendar entries. Users access these systems through computers, mobile phones, tablets, and other electronic devices.

Electronic communications have almost completely supplanted telephonic, written, and in-person methods of coordinating meetings. This increase means that users spend increasing amounts of time converting between electronic communication systems, such as those that facilitate correspondence via electronic message (such as e-mail or social networking platforms) and electronic calendar systems.

Increasingly, services are being offered that perform rudimentary integration between electronic communication systems and electronic calendar systems, especially in a business context. Examples of these systems include MICROSOFT OUTLOOK and EXCHANGE, GOOGLE Calendar and GMAIL, ZIMBRA Calendar and Mail, and ZOHO Calendar and Mail.

One conventional method for performing this integration includes providing a link or button to access the electronic calendar system from the electronic communication system, and vice versa. Another method provides the ability to "drag and drop" an email message into the calendar system, which allows the user to specify that the message contains event details, fill in those details manually, then include the body of the message in the calendar appointment.

Conventional methods are fraught with human transcription errors, as they require the user to change contexts between the electronic communication system and the electronic calendaring system to complete scheduling tasks.

Conventional methods are optimized for creating and maintaining a schedule for a single person, whereas most calendar scheduling involves multiple participants and multiple options. For example, a user may receive an email from a coworker asking for a meeting, with a list of times included. In a conventional workflow, the user must 1) Switch to the electronic calendar application, 2) verify each of the times to see which are suitable, 3) switch back to the email application to send a response, 4) wait for his coworker to confirm one of the times, 5) switch back to the calendar application to finally add an appointment to his schedule, 6) remind his coworker of the meeting beforehand. This process can lead to lost productivity, unnecessary stress, transcription mistakes, double-booking appointment times, and missed meetings.

Electronic mail specifications do not provide for the ability for electronic messages to be modified after they are sent, which prevents electronic communication systems from offering dynamic messages that can change based on a user's interactions or other data sources.

SUMMARY

Applicants have appreciated that available electronic communications technology does not provide effective tools for coordinating meetings, appointments, and scheduling. Existing electronic communications products are largely separated from electronic calendar products, with only limited connection points between them. Using electronic communications technology to coordinate scheduling information with others is left to the user.

Applicants have further appreciated that existing electronic calendar technology does not provide effective means for coordinating multiparty appointments. Traditional electronic calendars provide the means for multiple people to be participants in a meeting, and the ability to send meeting requests via electronic communications. They do not, however, provide a means for choosing from a set of times for an appointment, a means for effectively translating incoming meeting requests, methods for reminding other attendees about a meeting, or a means to track pending appointments that have not been confirmed. Additionally, they do not provide effective tools for choosing meeting locations.

Modifying Natural Language Segments Related to Calendar Functionality in an Electronic Message A system is provided in which instructions are executed which perform a method for identifying specific data in unstructured natural language text, linking that data with structured data sources, modifying or annotating that text with additional information from structured data sources, and adding interactive components that facilitate completing tasks that depend on the specific data.

In some embodiments of the present disclosure, the system may be applied to electronic messages that contain information related to calendar functionality. Calendar functionality may broadly be considered any function relating to a typical calendar application or any function typically applied to a calendar entry in an electronic calendar system or calendar application. Such calendar functions may include, but are not limited to: creating a calendar entry (such as an appointment, reminder, event, telephone conference, meeting, or any other entry of information in an electronic calendaring system or application), deleting a calendar entry, modifying a calendar entry, inviting others to a calendar entry, removing others from a calendar entry, scheduling a calendar entry, determining whether conflicts exist amongst calendar entries of a plurality of individuals, etc.

In some embodiments of the present disclosure, the system may be applied to electronic messages that contain natural language relating to appointments, scheduling, or meetings, such as locations, dates, or participant lists.

In some embodiments, structured data in a structured data source may be comprised of electronic scheduling data stored in one or more hosted or non-hosted electronic calendaring systems (such as MICROSOFT EXCHANGE, GOOGLE Calendar, ZIMBRA Calendar, etc.). In some embodiments, these systems may be used as sources of data for determining whether a segment of natural language in an electronic message is related to calendar functionality. In some embodiments, additional information from additional sources of structured data may be used to determine whether a segment of natural language in an electronic message is related to calendar functionality. These structured data sources may also be used as sources of information that are relied upon for modifying or annotating a segment of natural language that is related to calendar functionality. Structured data may be comprised of a calendar entry, or may be comprised of an empty time slot (also known as a time period) in a user's calendar that reflects that a time slot is open.

In some embodiments, structured data in a structured data source may be user-specific data. In some embodiments, structured data in a structure data source may be data specific to at least one sender or recipient of the electronic message. For example, in some embodiments, the structured data may reflect information from a calendar entry in an electronic calendar system or application. In some embodiments, the structured data may reflect information about an open time slot for which nothing is scheduled in an electronic calendar system.

In some embodiments, the system may automatically add structure to natural language text that contains information related to appointments, scheduling, or meetings and compare that information to information in the structured data source to determine whether or not a user is free or busy at a date or time provided in the unstructured text.

In some embodiments, the system may automatically, without user input, add visual elements, including but not limited to colors and formatting of the language relating to the structured data, as a method for annotating the unstructured text.

In some embodiments, these annotations may convey the recipient's availability at a specified date and time. In some embodiments, modifications such as changes to color (green for available, red for unavailable, yellow or orange for tentatively available or partially unavailable) may be applied to a segment of natural language in an electronic message so as to convey the recipient's availability at a specific time and date.

In some embodiments, the system may automatically, without user input, add visual elements, including but not limited to, symbols like "+" to the unstructured text, in order to provide interactive elements that use information from the structured data source to facilitate completion of tasks that depend on this data by users.

In some embodiments, the system may add visual elements that invoke a method for automatically structuring the natural language text that relates to the data source into a format matching the data source, and adding that data to the source.

In some embodiments, this method may provide for adding events to a user's calendar through interaction with symbols inserted into the natural language text.

In some embodiments, the system may automatically, without user input, add interactive behavior to elements in the unstructured text that provide additional, related information about the text relating to the structured data source, sourced from the structured data source In some embodiments, those interactive behaviors may include a "hover" behavior that provides a formatted view of the user's schedule for the same day as the detected date and time information.

In some embodiments, elements added through a user's interaction with the natural language text may themselves contain interactive elements that provide additional ways to interact with the structured data source.

In some embodiments, these elements may provide ways to see the data detailed in unstructured text as they would appear in the structured data source.

In some embodiments, these elements may invoke a method for automatically structuring the natural language text that relates to the data source into a format matching the data source, and adding that data to the source.

Tentative Scheduling of Calendar Entries

A system and method for allowing users to create calendar entries with special properties is provided. These properties provide a method by which a user may propose a set of calendar entries, store information identifying these entries as a set, and then automatically remove these entries once other attendees of the entry have confirmed a single time.

The set of calendar entries may consist of one calendar entry, or a plurality of calendar entries.

The user may annotate this set of calendar entries at the time he enters them into his electronic calendar system or application or after they have already been created.

The user may add these appointments through the appointment creation interface of their primary electronic calendar system or application or through any system that integrates with their primary electronic calendar system or application.

Annotated properties may include but are not limited to information about the set of calendar entries: time, date, location, notes, title, attendees, unique identifiers; information about the method by which the user entered the appointments into his electronic calendar system; specific contextual information from any calendar-integrated application, such as unique identifiers of messages if the user created the appointments through a calendar-integrated electronic messaging application.

These annotated properties may be stored as part of the same data source as the event details, such as in a hosted calendar system (GOOGLE Calendar, ZIMBRA Calendar) or a locally-served calendar system (MICROSOFT EXCHANGE), or in a separate data source.

The system may use any combination of annotated properties, data from other applications, and user-inputted data directly entered into the system to identify that a newly-added event relates to a set of annotated events.

In some embodiments of the invention, the system may use data about the electronic messages exchanged as part of the event-creation process to relate a newly-added event to a set of annotated events.

In some embodiments of the invention, the system may use overlap between the start and end times of a newly-added event and the start and end times of an event in an annotated set to create an association between them.

In some embodiments of the invention, when the system detects that a newly-added event relates to a set of annotated events, the system may prompt the user to remove the set of annotated events from his calendar.

In some embodiments of the invention, each of the annotated events may include, as part of the event details, uniquely identifiable information that allows a program to remove these events from a user's calendar individually or as a set.

Appointments that have been annotated with these properties may include a special delineation in the title of the appointment, which may comprise beginning with a set of symbols, or another method, to indicate their status both visually and programmatically.

Organizing Group Calendar Entries Via Electronic Messages

A system and method are provided for collecting data directly from an electronic message and dynamically adapting the content of the electronic message based on the input of data to the message from its recipients. In some embodiments, the system may be directed to organizing the preferences and availability of a plurality of prospective attendees associated with a calendar entry.

The system provides for a user ("the organizer") who wishes to collect data from a set of one or more people ("recipients") and provide real-time information to those recipients via an electronic message.

The system sends an electronic message to each of the recipients which includes both a form that provides the ability to input data directly from the electronic message and an embedded image loaded from a server on the internet.

The image may be assembled by the server when a recipient's electronic messaging client requests it, or it may be pre-assembled. In some embodiments, the image may be displayed in an electronic message via a reference embedded in the electronic message. In some embodiments, the image may be displayed by being directly embedded in the electronic message. In some embodiments, an image directly embedded in an electronic message may be updated when a user opens or re-opens the message.

The image may be created, entirely or in part, based on data collected from the recipient requesting the image, and data collected from other recipients.

The image may be re-created each time a recipient's electronic message client requests it.

The image may be the same or different for each of the recipients.

The image may provide information about the status of each recipient's entry of data into the included form.

The image may provide information based on the processing of any combination of data collected from recipients, including via the form provided in the electronic message, and external data sources, including the electronic calendar systems or applications of the recipients.

The system may send an electronic message to the organizer that allows the organizer to view the results via an image and interact with the results via interface elements added to the electronic message.

The image provided to the organizer may be the same as the image provided to the recipients, or it may be different. In some embodiments, only the organizer may see an image that reflects responses for all recipients. In some embodiments all recipients may only see an image that reflects responses from organizer and a particular recipient.

In one embodiment of the invention, the organizer may request answers to a series of multiple-choice questions in the included form, and display the results of those questions in a grid format.

In a further embodiment of the invention, the system may include symbols and colors in the grid to emphasize the results.

In one embodiment of the invention, the organizer may conduct a poll or survey via an electronic message and share the votes of each of the recipients amongst all the recipients via the image. In some embodiments, such a poll or survey may comprise multiple choice questions.

In another embodiment of the invention, the organizer can send a list of possible times for an event to a set of recipients via electronic messaging. The organizer can request that they provide their availability at each of those times, and provide their responses to any subset of the recipients.

In a further embodiment of the invention, the message delivered to the organizer may include elements that provide for confirming an event time, including elements that allow the organizer to add the event to his own calendar and prefill an electronic message to any subset of the recipients with confirmation details.

In an embodiment of the invention, the system can automatically fill in requested data on behalf of the recipients, through annotation of the message with elements not visible to user and interaction with a structured data source.

Providing Suggestions for Time and Locations for Calendar Entries

A method is provided for determining suggested times and locations for meetings automatically.

The method may use a combination of user-specific data, publicly-accessible data, geolocation data, and user-inputted data in order to determine the optimal time and location of a meeting.

The method may present a suggested time and location for the meeting based on assumed user preferences. The system may then provide a method for a user to regenerate the time and location after specifying preferences. In some embodiments, the suggested time and location may be based, at least in part, on a user's prior selection of time and locations for prior calendar entries.

The method may provide the ability for the user to independently modify or regenerate times and locations.

The method may store data about a user's previous interaction with this system and may draw from that data to assume user preferences or annotate any other data source input.

In accordance with one embodiment of the invention, the method may aggregate data from venue databases (for example, popular websites and social media providers such as YELP, GOOGLE Places, FOURSQUARE), data from electronic calendar systems, and data from mapping systems (Such as GOOGLE Maps or MAPQUEST) and process this data according to a weighing system.

In accordance with a further embodiment of the invention, the system may automatically present an optimal weighing based on assumed user preferences.

In accordance with a further embodiment of the invention, the system may generalize user preferences into a set of common meeting vehicles, such as breakfast meetings, lunch meetings, dinner meetings, meetings for drinks, or meetings at coffeehouses.

Scheduling Across Multiple Time Zones

A method is provided for facilitating the proposal of meetings in more than one time zone via electronic messages.

The method may be invoked from either a user's electronic calendar system or his electronic messaging system.

The method may display a graphical view of the user's events from his electronic calendar system.

The user may specify acceptable meeting times by clicking-and-dragging, by clicking alone, or by using a keyboard to select times.

In accordance with one embodiment of the system, the user clicks a dropdown next to the time zone display in the graphical view of the calendar system. The user may either change the time zone or add an additional time zone to the message.

In accordance with a further embodiment of the invention, the user may select from a list of time zones that are geographically located near his own, or he may search for a specific time zone.

The system causes the list of selected dates and times to be inserted into an electronic message either within the user's electronic mail system, or via a system integrated with it. The system creates that list in a manner that lists each time in both time zones the user chose.

Automatic Reminders Via Electronic Message of Calendar Entries

A method is provided for automatically sending calendar entry reminders via an electronic message.

When a user creates a calendar entry in an electronic calendar system, the system provides an option to attach a reminder email to the calendar entry.

The invention of the present disclosure may provide a default reminder time to the user. The default reminder time may be calculated based on the proximity of the event date to the current date.

The system automatically sends an email to the user and any other attendees associated with the calendar entry. In some embodiments, the recipients of the reminder message may be determined by relying, at least in part, on the recipients of previous electronic messages that mentioned the calendar entry.

If the user cancels the event, the system will automatically cancel the reminder.

The disclosure of the present invention may also be combined with systems and methods for applying game mechanics to the completion of tasks by users, as described in U.S. Patent Publication No. 2013/0006403 A1, the entirety of which is incorporated herein by reference.

Suggesting Tentative Time Periods for Meetings and Allowing Recipients the Ability to Confirm A system is further provided in which a user (who may be referred to as an "organizer") seeks to suggest one or more proposed meeting times to one or more recipients. The organizer may choose to communicate with said recipients via an electronic message medium, such as e-mail. The organizer may initiate the creation of an electronic message, and may seek to include tentative time periods for a potential meeting or event that will eventually be reflected in a new calendar entry in that message. The organizer may be presented with information from his electronic calendar system that demonstrates his availability, for example, a calendar grid that represents the organizer's availability for the upcoming week. The organizer may then select the tentative time periods for the meeting or event he desires to schedule by clicking directly on the calendar grid and dragging his mouse pointer across the different tentative time periods he would like to suggest for the meeting. In an alternative embodiment, the organizer may tap on a touch screen and drag his finger in order to select the different tentative time periods he would like to suggest for the meeting. Once the organizer's selections are complete, a graphical representation of the tentative time periods for the new meeting or event may be included in an electronic message. This graphical representation may be a calendar grid that shows the selected tentative time periods, as well as information indicative of the organizer's general availability (for example, whether the organizer is busy during certain time periods that have not been selected as tentative time periods). The graphical representation visually displays calendar related information in a manner other than plain text. In some embodiments, the graphical representation may be an image. In some embodiments, the graphical representation may be a combination of one or more images. In some embodiments, the graphical representation may be a combination of HTML, text, and images. The graphical representation may rely on content reflecting the organizer's selection of tentative time periods and/or calendar availability that is not stored in the electronic message itself, but is instead stored at a remote location. This remotely stored content can then be updated as necessary to reflect changes to the organizer's availability or changes to the selected tentative time periods as information in the organizer's calendar system changes. The graphical representation may employ a color scheme that distinguishes the selected tentative time periods from other time periods that may be designated as busy or otherwise available.

Once the graphical representation of the organizer's selected tentative time periods and/or calendar availability have been included in the electronic message, it can be sent to one or more recipients. A recipient may open the electronic message and the graphical representation of the organizer's selection of tentative time periods for a new meeting or event and/or the organizer's calendar availability may be displayed. Since the graphical representation relies on remotely located content reflecting the organizer's selection of tentative time periods for a new meeting or event and/or the organizer's calendar availability, the recipient will be provided with an updated display of the relevant calendar information every time the electronic message is refreshed or re-opened. Additionally, the graphical representation may provide the recipient with the ability to click on one of the tentative time periods in order to select and confirm one of the time periods for the meeting or event suggested by the organizer. When the recipient confirms a particular time period, a message or other confirmation may be sent back to the organizer or the organizer's electronic communication and/or calendar system indicating that one of the tentative time periods has been confirmed. A new calendar entry can then be created in the organizer's calendar and any previously selected tentative time periods cleared. At the same time, a calendar invite may be sent to the recipient who confirmed said time period.

In some embodiments, the electronic message suggesting tentative time periods for a meeting may be sent to, or received by, multiple recipients. In such embodiments, the invention of the present disclosure may be used to create appointment slots according to the availability and confirmation of multiple recipients. For example, a first recipient may confirm that more than one of the tentative time periods works for a potential meeting. Any tentative time periods that are not selected would cease to be associated with the tentative meeting. Once such first recipient makes such a confirmation, remotely stored content that is relied upon by the graphical representation in an electronic message may be updated so that when a second recipient opens his electronic message, the graphical representation that is displayed to the second recipient only reflects the tentative time periods that have also been confirmed by the first recipient.

Dynamically Updating Shared Calendar Information

A system is further provided in which a user (who may also be referred to as a "sender") desires to generally share calendar information relating to his availability with others ("calendar availability"). Accordingly, a user may initiate the process of composing an electronic message, and desire to insert into the electronic message information relating to his calendar availability for an upcoming time period, for example, the upcoming week. The sender may insert into the e-mail a graphical representation of his calendar availability for a particular time period that may consist of a calendar grid demonstrating the sender's availability across a number of days. This graphical representation may rely on content reflecting information in the sender's calendar system that is remotely located and is not actually stored in the electronic message. Such remotely located content may then be updated as the sender's calendar information is updated. Accordingly, a recipient may then receive the electronic message, but would receive an updated graphical representation of the sender's availability every time the electronic message is refreshed or re-opened.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIG. 7 is an exemplary user interface demonstrating the incorporation of calendar functionality into an electronic message.

FIG. 8 is an exemplary user interface demonstrating the incorporation of calendar functionality into an electronic message.

FIG. 9 is an exemplary user interface demonstrating the incorporation of calendar functionality into an electronic message.

FIG. 10 is an exemplary user interface demonstrating the incorporation of calendar functionality into an electronic message.

FIG. 11 is an exemplary user interface demonstrating the incorporation of calendar functionality into an electronic message.

FIG. 13 is an exemplary user interface demonstrating the incorporation of calendar functionality into an electronic message.

FIG. 14 is an exemplary user interface demonstrating the incorporation of calendar functionality into an electronic message.

FIG. 15 is an exemplary user interface demonstrating the incorporation of calendar functionality into an electronic message.

FIG. 16 is an exemplary user interface demonstrating the incorporation of calendar functionality into an electronic message.

FIG. 17 is an exemplary user interface demonstrating the incorporation of calendar functionality into an electronic message.

FIG. 19 is an exemplary user interface demonstrating the incorporation of calendar functionality into an electronic message.

FIG. 22 is an exemplary user interface demonstrating the incorporation of calendar functionality into an electronic message.

DETAILED DESCRIPTION

Figure 1A:
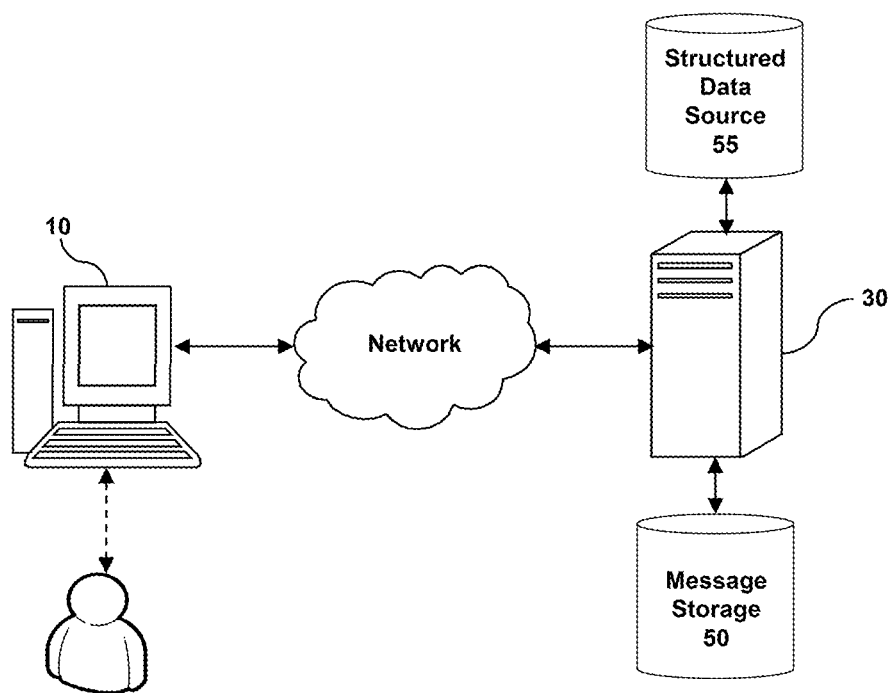
FIG. 1A is a block diagram of a system for incorporating calendar functionality into electronic messages according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

In reference now to FIG. 1A, a system for incorporating calendar functionality into electronic message is shown. Local machine 10 may access a server 30 which may provide electronic message services to a user. Local machine 10 may be a desktop computer, a server, a laptop, a tablet computer, a smart phone, or any other computing device capable of running a user interface. The server 30 may be a single server, a plurality of servers, a server farm, or computing services provided by a cloud based provider of computer services.

Such a plurality of servers need not be located at the same location. In some embodiments, server 30 may be a plurality of servers operated by a plurality of different parties, entities, and service providers. The server 30 may be an electronic message server through which a user of local machine 10 may access electronic messages. Electronic messages may be stored in message storage 50. Structured data may be stored in structured data source 55. The Network depicted in FIG. 1A may be a local area network (LAN), wide area network (WAN), some other form of public or private network, or the Internet.

In some embodiments, message storage 50 may be located at local machine 10 rather than at a server. In some embodiments, message storage 50 may be distributed across local machine 10 and server 30. In some embodiments, message storage 50 may be replicated across a plurality of local machines 10 and servers 30.

In some embodiments, server 30 may be an E-mail server. In some embodiments, server 30 may be running MICROSOFT EXCHANGE E-mail server software. In other embodiments, server 30 may be part of a hosted E-mail provider, such as the GMAIL service presently provided by GOOGLE, Inc., the HOTMAIL service presently offered by MICROSOFT, or numerous other similar online services for providing users with access to electronic messages.

In some embodiments, structured data source 55 may be an electronic calendar system, including calendaring software systems, such as MICROSOFT EXCHANGE, GOOGLE Calendar, ZIMBRA Calendar, iCAL, etc.) In some embodiments, structured data source 55 may be a database of information associated with an electronic calendar system. In some embodiments, structured data source 55 may simply be a file or database representative of calendar information, such as an iCALENDAR file. In some embodiments, structured data source 55 may be any form of database that contains structured data related to calendar functionality. Structured data should be broadly understood as any form of structured data that could be stored in a database, file, or other mechanism for electronic storage. In some embodiments, structured data may reflect information from a calendar entry in a structured data source. In some embodiments, structured data may reflect information about an open time slot, or information reflecting that no calendar entry exists for a particular time period, from a structured data source.

In some embodiments, server 30 may be providing a user with a proprietary electronic messaging platform. For example, server 30 may be providing a user with the "Messages" feature offered by FACEBOOK, Inc; the "INMAIL" feature provided by LINKEDIN, or the "Direct Message" feature provided by TWITTER. Numerous other proprietary messaging platforms are contemplated within the present disclosure.

In some embodiments, server 30 may be providing a user with access to voicemail services. In some embodiments, server 30 may be providing a user with electronically recorded audio voicemails. In some embodiments, server 30 may be providing a user with access to transcribed voicemails. In some embodiments, server 30 may be providing a user with access to text messages, such as those utilizing the SMS protocol, or any other text message protocol.

The systems and methods of the present disclosure may be performed entirely at local machine 10, entirely at server 30, or on some combination of local machine 10 and server 30. In some embodiments, all the services that may be provided by server 30 may be provided by local machine 10, or a combination of local machine 10 and server 30. In some embodiments, all the service that may be provided by local machine 10 may be provided by server 30, or a combination of local machine 10 and server 30.

In some embodiments of the present disclosure, electronic messages stored at message 30 may be organized into different folders, labels, categorizations, collections, or any other manner of categorizing and organizing electronic messages. By default, most electronic messaging solutions provide that new messages are received and stored on behalf of the user at a particular folder, label, category, collection, or any other identifier for categorizing and organizing electronic messages. In the context of E-mail, most E-mail solutions provide that this default folder, label, category, collection, or any other identifier for categorizing and organizing electronic messages is identified as an "inbox." Users of E-mail generally check their inbox for new messages and then reply, forward, delete, or archive their messages accordingly.

The concept of an inbox is generally applicable to all electronic messaging platforms beyond E-mail, and can be generalized as any folder, label, category, collection or any other identifier for categorizing and organizing electronic messages. For example, many users of E-mail utilize a "For Follow Up" folder to which they move E-mails to from the default "Inbox". The user generally intends to follow up on these E-mails or perform some action on them at a later time. It would be understood by those skilled in the art that in such a situation, the "For Follow Up" folder may be a relevant inbox for the purposes of practicing the present disclosure, in addition to the default "Inbox" provided by the electronic messaging service. In some embodiments of the present disclosure, the default folder, label, category, collection, or other identifier for categorizing and organizing electronic messages in to which new messages are placed may not be labeled as an "Inbox".

Figure 1B:
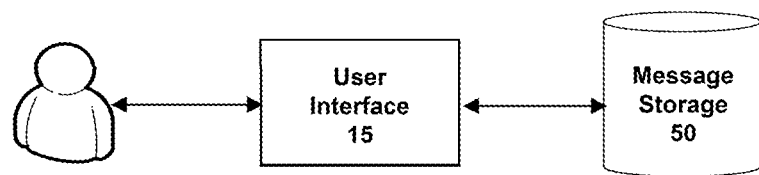
FIG. 1B is a block diagram of a system for providing a user interface to a user for incorporating calendar functionality into electronic messages according to one embodiment of the present disclosure.

In reference now to FIG. 1B, a block diagram of an embodiment of a system for incorporating calendar functionality into an electronic message is depicted. A user interface 15 is provided to the user for performing the invention of the present disclosure. The user interface 15 is in communication with message storage 50. The user interface 15 and message storage 50 may be located on the same machine or on different machines. The user interface 15 may operate on local machine 10, server 30, or a combination of local machine 10 and server 30. The user interface 15 and message storage 50 may be in communication over a network. Electronic messages may be organized into folders, labels, categories, collections or by any other means for categorizing and organizing electronic messages at the user interface 15, at message storage 50, at server 30, or any one or combination of these. In some embodiments, user interface 15 may operate as a third-party intermediary between the user and his or her electronic message provider. In such embodiments, the user interface 15 may operate on a third party server 30, the electronic message service provider's servers 30, on local machine 10, or a combination of all of these.

Figure 1C:
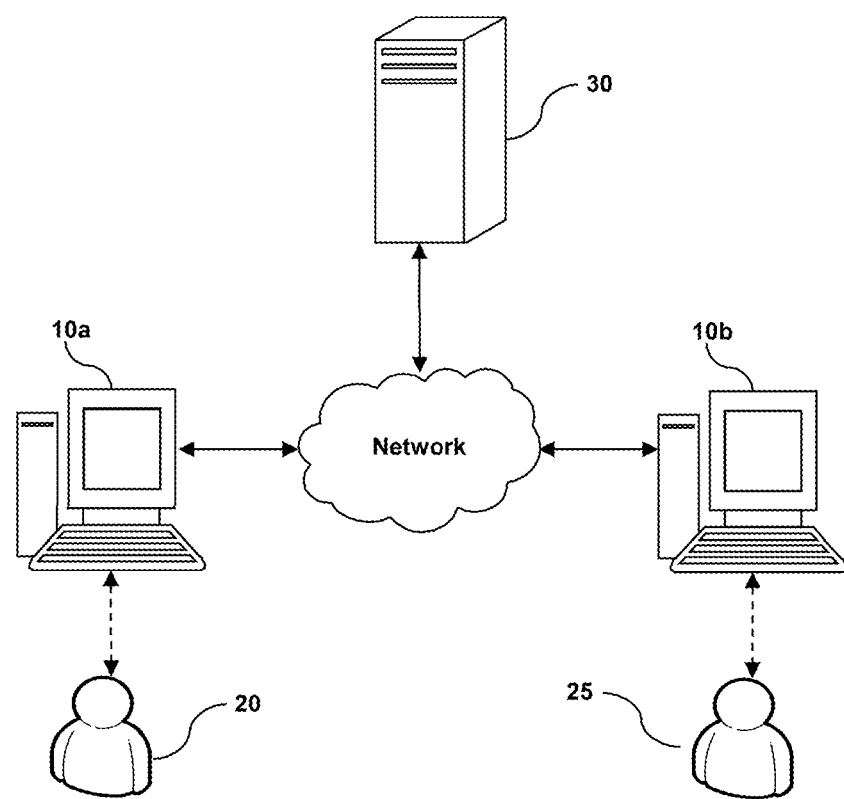
FIG. 1C is a block diagram of a system for incorporating calendar functionality into electronic messages according to one embodiment of the present disclosure.

In reference now to FIG. 1C, a block diagram of an embodiment of a system for incorporating calendar functionality into an electronic message is depicted. A user 20 may utilize local machine 10*a* to communicate with user 25. User 25 may in turn utilize local machine 10*b* to communicate with user 20. Both users 20 and 25 may be in communication with server 30 and may utilize respective user interfaces to engage in communications with one another. In some embodiments, users 20 and 25 may utilize the same or similar user interfaces and/or electronic communication and/or calendar systems provided via local machines 10*a* and 10*b*. For example, both users 20 and 25 could be using the same electronic communication and/or calendar system. An example of such a situations would be where both users 20 and 25 both utilize GOOGLE's GMAIL service or both utilize MICROSOFT'S OUTLOOK and/or EXCHANGE products. In other embodiments, users 20 and 25 may utilize different user interfaces and/or electronic communication and/or calendar systems. For example, user 20 could be using one electronic communication and/or calendar system, while user 25 could be using a different electronic communication and/or calendar system. An example of such a situation would be where user 20 utilizes GOOGLE's GMAIL service while user 25 utilizes MICROSOFT'S OUTLOOK and/or EXCHANGE products (or vice versa). An electronic communication system and/or electronic calendar system may be one and the same system, since many electronic communication systems include within them electronic calendar systems (and vice-versa) even though functionality between the electronic communication aspects of the system and electronic calendar aspects of the system may be limited. Additionally, electronic communication systems and/or electronic calendar systems may operate in conjunction with a variety of other software, applications, programs, and plug-ins. It is intended herein that any reference to an electronic communication system refers to all software, applications, programs, and plug-ins that operate in conjunction with the underlying electronic communications system.

In some embodiments users 20 and 25 may utilize a combination of similar and different user interfaces and/or electronic communication systems. For example, both users 20 and 25 could be using the same electronic messaging system, but could be using a different electronic calendar system (or vice versa). An example of such a situation would be where both users 20 and 25 both utilize GOOGLE's GMAIL service to facilitate communications via E-mail, but rely on MICROSOFT OUTLOOK and/or EXCHANGE for calendar functionality. An alternative example of such a situation would be where user 20 utilizes GOOGLE's GMAIL service for E-mail and MICROSOFT's OUTLOOK and/or EXCHANGE products for calendar functionality while user 25 utilizes MICROSOFT'S OUTLOOK and/or EXCHANGE for E-mail and GOOGLE's GMAIL service for calendar functionality.

In some embodiments, user 20 may request that a calendar entry be created. In such situations, user 20 may be identified as an "organizer" or "sender" for said calendar entry. User 20, the organizer, may invite or otherwise request user 25's involvement with said calendar entry. In such situations, user 25 may be referred to as a "recipient" associated with the calendar entry. In some embodiments, there may be more than one recipient associated with a particular electronic message and/or calendar entry who are not depicted in FIG. 1C but situated similarly to user 25. In some embodiments, both the organizer (user 20) and any recipients (user 25 and any other similarly situated users) may also be referred to as "attendees".

Generally, and with reference to FIG. 1C, user 20 and 25 may be in electronic communication with one another utilizing any electronic communication and/or calendar system of their choosing. User 25's choice of electronic communication and/or calendaring system does not affect the ability of user 20 to employ the systems and methods described herein, while user 20's choice of electronic communication and/or calendar system does not affect the ability of user 25 to employ the systems and methods describes herein. Accordingly, while both users 20 and 25 may be referred to as "users" they may not necessarily be users of the same underlying electronic communication and/or calendar system, application, program, or protocol.

In continuing reference to FIG. IC, any electronic communications systems, as well as any software, programs, applications, and/or plug-ins operating in conjunction therewith utilized by users 20 and 25 may be provided via any combination of local machines 10a and 10b as well as server 30 (which may itself be comprised of multiple servers and/or distributed applications and software programs, applications, or plugins). For example, a front-end user interface utilized by user 20 may provide certain aspects of user 20's electronic communication system, while certain back-end functions are provided by server 30. Meanwhile, a front-end user interface utilized by user 25 may provide certain aspects of user 25's electronic communication system while certain back-end functions are provided by a server similar to server 30 but which is not pictured in FIG. 1C. In some embodiments, server 30 may provide software programs, applications, or plug-ins that are independent from the electronic communication and/or calendar systems used by users 20 and 25 but which work in conjunction with the electronic communication systems of one or more of users 20 and 25. For example, user 20 could be utilizing a first electronic communication system while user 25 utilizes a second electronic communication system which is different from user 20's first electronic communication system. User 20's electronic communication system may be provided by any combination of local machine 10a and/or a server that is not pictured. User 25's electronic communications system may be provided by any combination of local machine 10b and/or a server that is not pictures. User 20's electronic communication system may also operate in conjunction with software, programs, applications, and plugins provided by any combination of local machine 10a and server 30. For example, a plug-in capable of providing the systems and methods of the present disclosure may be installed at local machine 10a which facilitates interaction with software programs and applications provided by server 30. In such an embodiments, server 30 may provide much of the functionality associated with the present disclosure, and may be in communication with remotely located storage that may be utilized by the systems and methods of the present disclosure. In some embodiments, user 25's electronic communication system need not have such a plug-in installed in order to achieve functionality of the present disclosure. In some embodiments, user 25's electronic communications system could have a similar plug-in installed (at local machine 10b).

Figure 2:
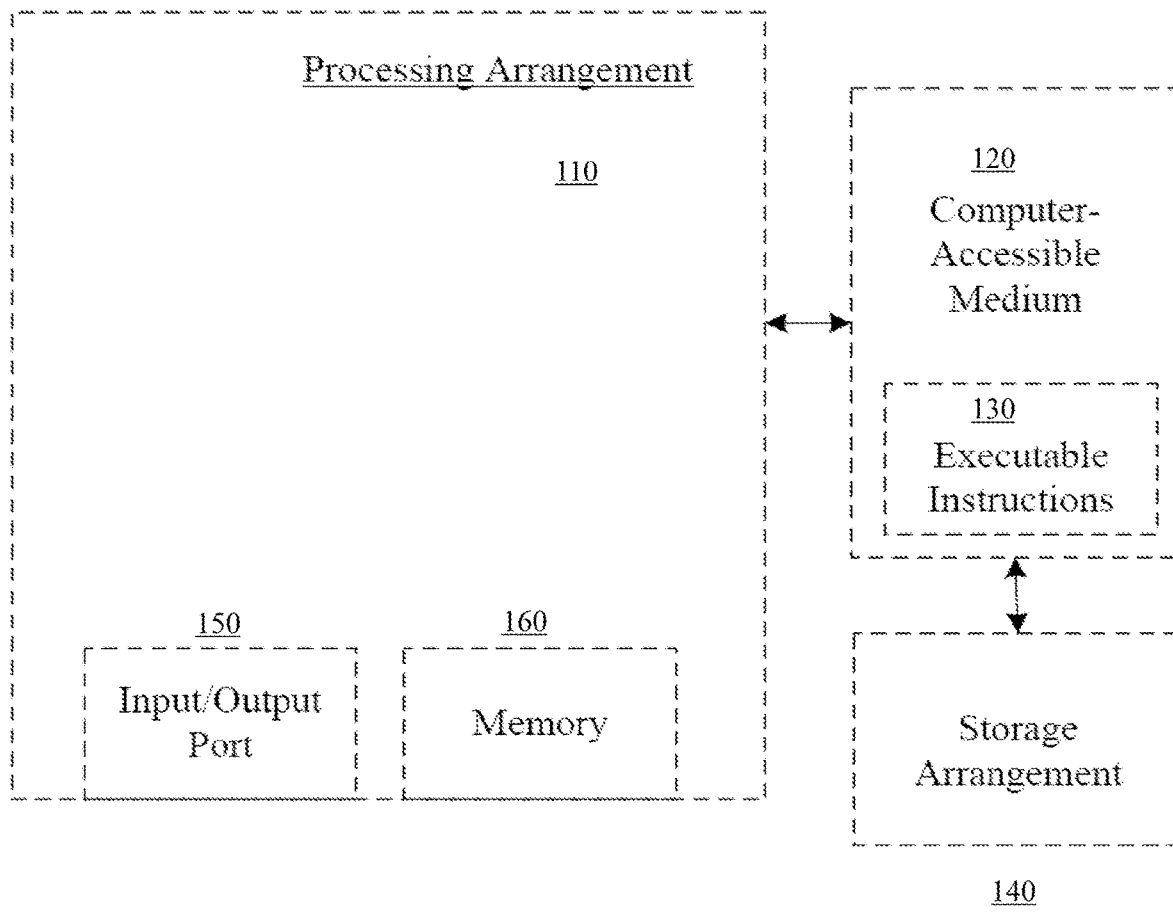
FIG. 2 is a block diagram of an exemplary embodiment of a system 100 according to the present disclosure for executing computer executable instructions performed by processing arrangement 110 and/or a computing arrangement 110, according to one embodiment of the present disclosure.

In reference now to FIG. 2, a block diagram of an exemplary embodiment of a system capable of implementing the present disclosure is shown. For example, an exemplary procedure in accordance with the present disclosure can be performed by a processing arrangement 110 and/or a computing arrangement 110. Such processing/computing arrangement 110 can be, e.g., entirely or a part of, or include, but not be limited to, a computer/processor that can include, e.g., one or more microprocessors, and use instructions stored on a computer-accessible medium (e.g., RAM, ROM, hard drive, or other storage device).

As shown in FIG. 2 a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

Figure 3:
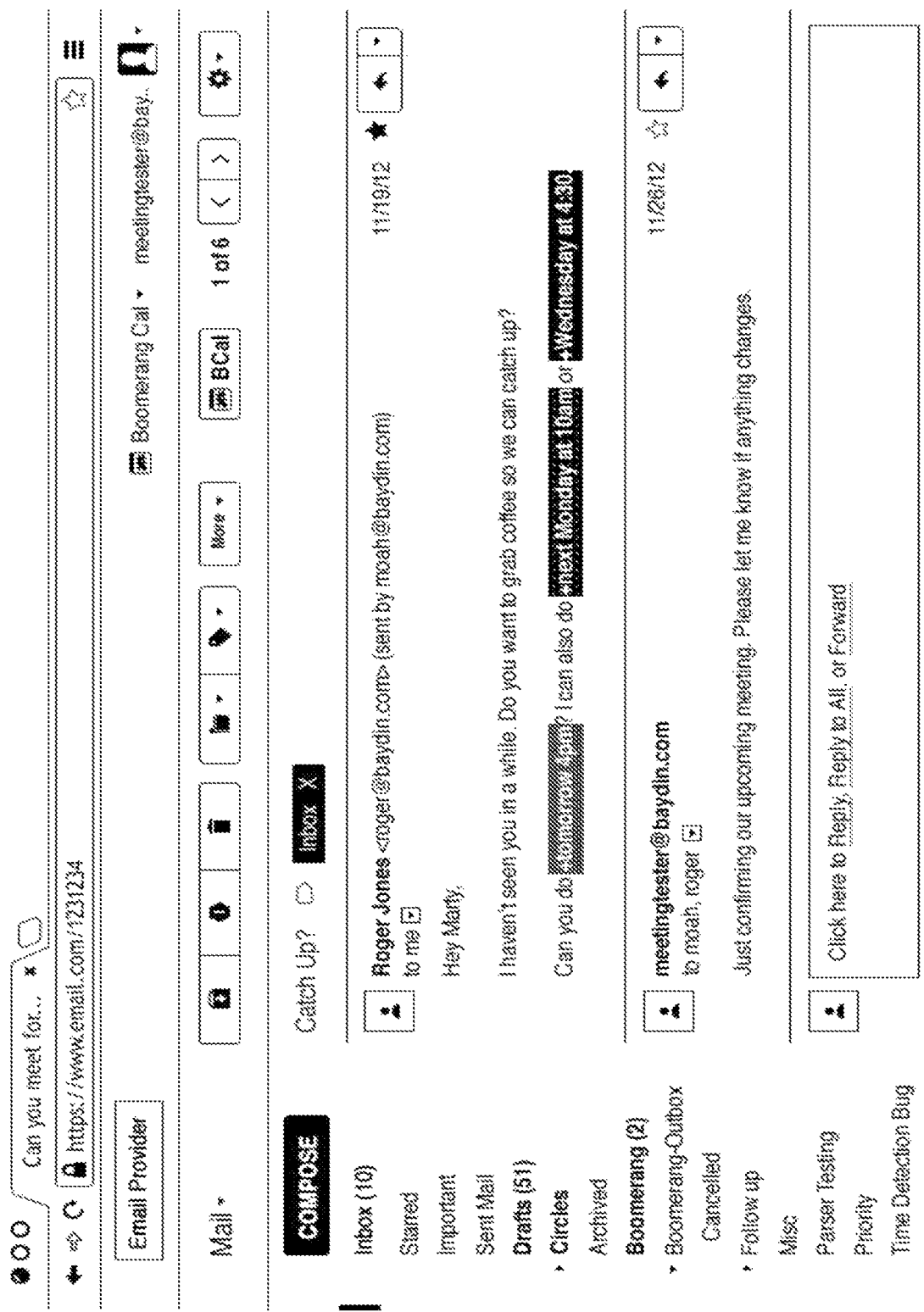
FIG. 3 is an exemplary user interface demonstrating the incorporation of calendar functionality into an electronic message.

In reference now to FIG. 3, an embodiment of a method for incorporating calendar functionality into e-mail is depicted. In FIG. 3, the representation of the segments of natural language "tomorrow 4 pm", "next Monday at 10 am" and "Wednesday at 4:30" have been modified according to the present disclosure. Pursuant to the present disclosure, a determination was made that these segments of natural language relate to calendar functionality. For example, these segments of natural language relate to scheduling a calendar entry at the times designated (i.e., "tomorrow 4 pm", "next Monday at 10 am", and "Wednesday at 4:30").

In further reference to FIG. 3, the representation of the natural language segments "tomorrow 4 pm", "next Monday at 10 am" and "Wednesday at 4:30" have been modified so as to reflect an association between those segments of natural language and calendar functionality. In some embodiments, the modification may comprise underlining the segment of natural language. In some embodiments, the modification may comprise bolding or changing the font of the segment of natural language. In some embodiments, the modification may comprise making the segment of natural language a link. In some embodiments, the modification may comprise changing the color of the segment of natural language. In some embodiments, the modification may comprise annotating the segment of natural language in some fashion. In some embodiments, the modification may comprise adding characters or symbols before or after the segment of natural language. In some embodiments, the modification may comprise adding a symbol before or after the segment of natural language. In some embodiments, the modification may comprise adding an image before or after the segment of natural language. In some embodiments the modification may comprise substituting the segment of natural language with some form of structured text (for example, replacing "tomorrow at 4 PM" with "Tuesday, Nov. 20, 2012 4:00 PM"). In some embodiments, the modification may comprise at least one, a plurality, or all of these modifications.

In some embodiments, the modification to the segment of natural language may involve changing the color of the segment of natural language in a manner that relies at least in part on information from the electronic calendar system or application. For example, in some embodiments, a segment of natural language relating to a particular time for a possible calendar entry may be modified depending on whether a user is busy, available, or tentatively available for a particular time. For example, and with reference to FIG. 3, if a user is, according to information stored by the calendaring system or application in a structured data source, tentatively available at "tomorrow 4 PM", not available "next Monday at 10 am", and is available "Wednesday at 4:30"; "tomorrow 4 PM" may be modified by being colored yellow or orange to reflect that the user is tentatively available, "next Monday at 10 am" may be modified by being colored red to reflect that the user in not available, and "Wednesday at 4:30" could be colored green to reflect that the user is available.

In some embodiments, the modification to the representation of said segment of natural language may rely, at least in part, on structured data from a structured data source, such as an electronic calendar system. In some embodiments, the modification to the representation of said segment of natural language may rely, at least in part, on user-specific structured data, for example, a user's calendar information. In some embodiments, the modification to the representation of said segment of natural language may rely, at least in part, on a sender's electronic calendar system. In some embodiments, the modification to the representation of said segment of natural language may rely, at least in part, on at least one recipient's electronic calendar system. For example, structured data that reflects that a user already has a calendar entry for a given time period may result in the segment of natural language being colored red, whereas structure data reflecting that a user has something tentatively schedule for a given time period would lead to coloring the segment of natural language being colored yellow or orange, and structure data reflecting that a user has an open time slot, or nothing schedule during a particular time period, would result in the segment of natural language being colored green. In some embodiments, the modification of the representation of said segment of natural language may rely, at least in part, on whether a particular user is busy or available for the time period proposed according to structure data from an electronic calendar system that is specific to said user.

In some embodiments, the determining that an electronic message contains a segment of natural language that relates to calendar functionality may be made relying at least in part on the overall context of the electronic message, and may incorporate and analysis of the natural language of the entire message. For example, a determination that "tomorrow 4 pm" in FIG. 3 is a segment of natural language that relates to calendar functionality may rely, at least in part, on the fact that the electronic message contains the language indicative of a future meeting, such as the statement "Do you want to go grab coffee" in FIG. 3.

In some embodiments, the determining that an electronic message contains a segment of natural language that relates to calendar functionality may be made relying at least in part on prior electronic messages. For example, in FIG. 3 the determination that the natural language segment "tomorrow 4 pm" is related to calendar functionality may be made by relying at least in part on the content of prior electronic messages between Roger Jones and meetingtester@baydin.com. In some embodiments, the determination could be made by relying at least in part on prior e-mails between meetingtester@baydin.com and others. In some embodiments, the determination may be made by relying at least in part on structured data from a structured data source, such as an electronic calendar system. In some embodiments, the determination could be made by additionally relying at least in part on data from other sources, including publicly available data or databases of information for facilitating the parsing of natural language.

Figure 4:
FIG. 4 is an exemplary user interface demonstrating the incorporation of calendar functionality into an electronic message.

In reference now to FIG. 4, an embodiment of a method for incorporating calendar functionality into e-mail is depicted. The modified segment of natural language described with respect to FIG. 3 may be modified so as to display additional information related to calendar functionality upon interaction by a user. For example, and as shown in FIG. 4, a user may hover over the modified segment of natural language and a window may appear displaying additional information relating to calendar functionality. This additional information may provide the user with the ability to create a calendar entry at the time indicated in the relevant segment of natural language. For example, and as shown in FIG. 4, a user is shown his schedule for Wednesday, November 21 and the tentative calendar entry time (4:30-5:00 PM) is shown.

The user may then click on the "Add This Event" button to add a calendar entry in his electronic calendar system or application directly from within the context of his or her electronic message interface. In some embodiments, such functionality may be made available upon "clicking" the relevant segment of natural language rather than hovering over it. In some embodiments, such functionality may be made available upon "clicking" or "hovering" above a character or symbol added before or after the segment of natural language (for example, the "+" sign that is shown in FIGS. 3 and 4.

Figure 5:
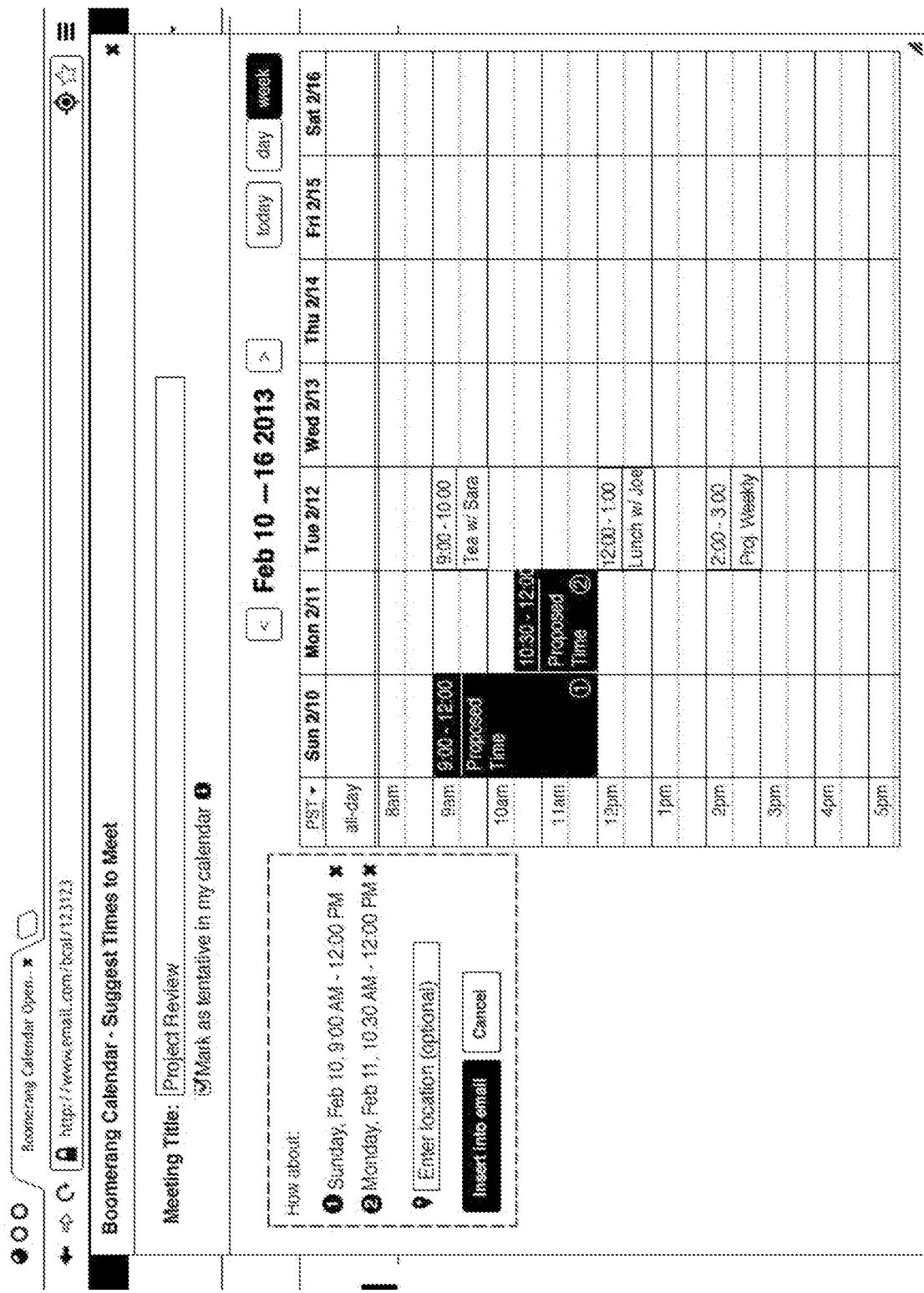
FIG. 5 is an exemplary user interface demonstrating the incorporation of calendar functionality into an electronic message.

In reference now to FIG. 5, an embodiment of a method for incorporating calendar functionality into e-mail is depicted. In FIG. 5, a user may create one or more calendar entries that are identified as "tentative". As shown in FIG. 5, a user may create a tentative calendar entry blocking off the period from 9:00 AM to 12:00 PM on Sunday and also a period from 10:30-12:00 PM on Monday. In some embodiments, these time entries may be suggested to a user, as demonstrated in the "How about" suggestion box on the left side of FIG. 5. In some embodiments, a user may accept one or more of the suggested periods for a tentative calendar entry, and may choose to insert these tentative times into an electronic message. For example, in FIG. 5, a user may simply click on the "Insert into email" button to add the tentative calendar entries into an e-mail for the purposes of proposing multiple times for a possible meeting or appointment to one or more prospective attendees.

Figure 6:
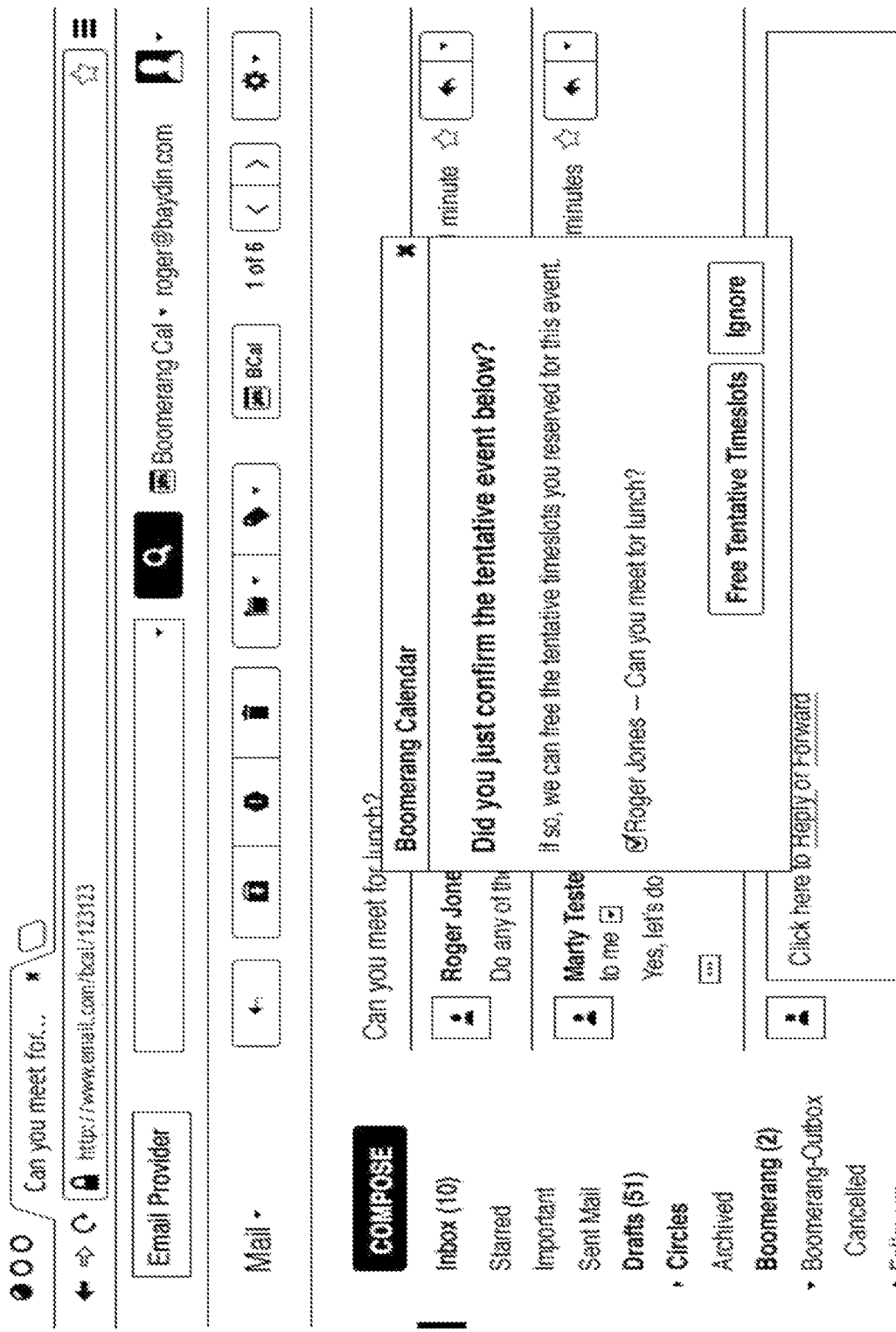
FIG. 6 is an exemplary user interface demonstrating the incorporation of calendar functionality into an electronic message.

In reference now to FIG. 6, an embodiment of a method for incorporating calendar functionality into e-mail is depicted. In FIG. 6, a user may confirm a particular time slot for a calendar entry simply by responding to an e-mail received by another user proposing one or more time slots for a tentative calendar entry. For example, and in reference to FIG. 6, Roger Jones proposed a plurality of time slots for a tentative calendar entry to Marty Tester. Marty Tester responded "Yes, let's do Sunday . . . " According to the invention of the present disclosure, a determination was made that the natural language in Marty Tester's Response was a confirmation to at least one of the time slots for a tentative calendar entry proposed by Roger Jones. Accordingly, and as shown in FIG. 6, the system prompts the user to confirm that a time slot for the tentative calendar entry has been confirmed. In some embodiments, a user may click on the "Free Tentative Timeslots button, which would create the calendar entry without a tentative identifier and would release the previous time slots identified as tentative for the tentative calendar entry. In some embodiments, the user may click the "Ignore" button as shown in FIG. 6 if they did not intend to confirm a calendar entry for one of the tentative time slots.

Figure 7:
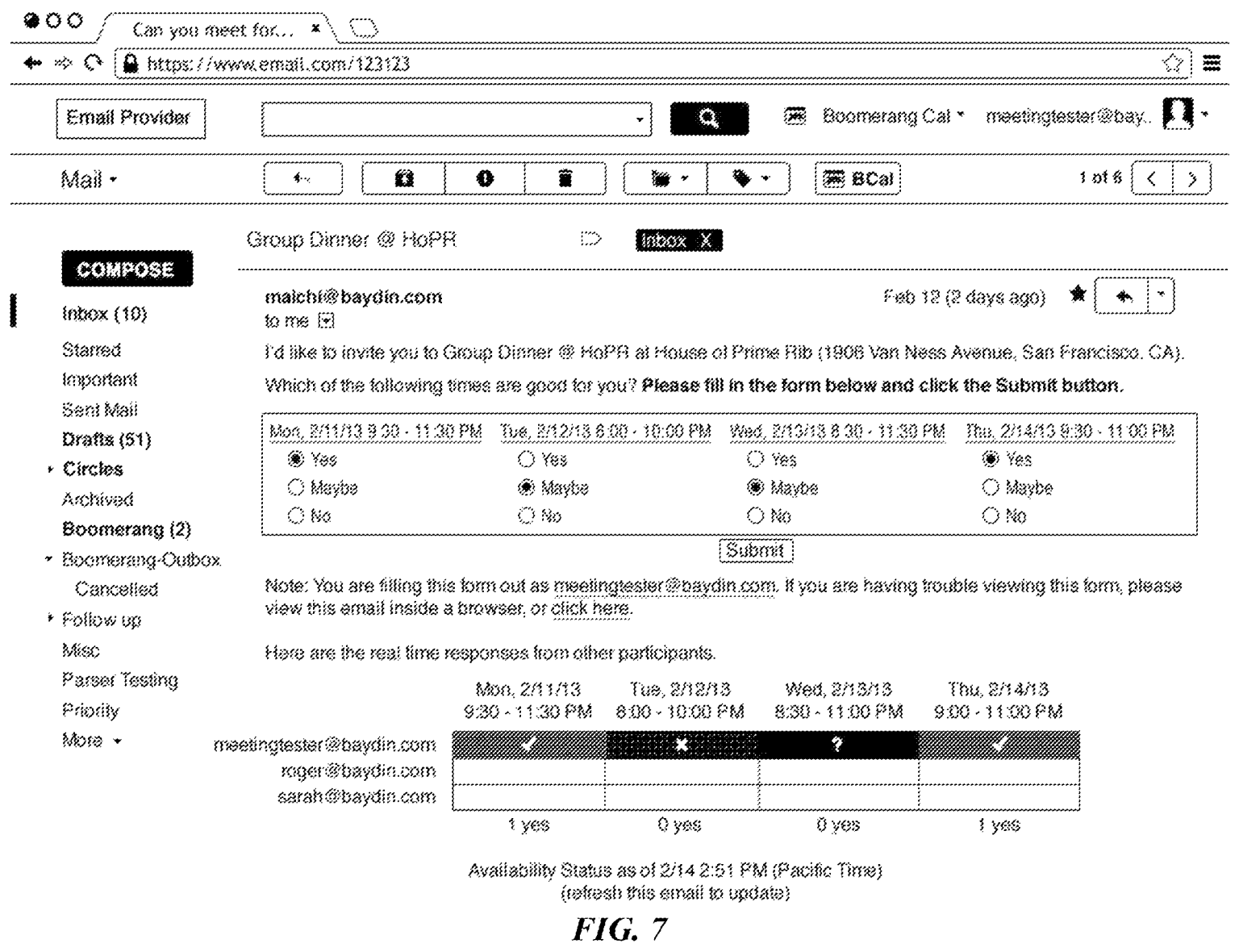

In reference now to FIG. 7, an embodiment of a method for incorporating calendar functionality into e-mail is depicted. As shown in FIG. 7, a user (maichi@baydin.com) may send an electronic message with a form (the table shown in FIG. 7 with dates and times in the first row and radio buttons indicating Yes/Maybe/No in each column) and an image (the second table with dates and times in the first row, and each recipient's response to the form in the columns). As demonstrated in FIG. 7, recipient meetingtester@baydin.com has completed the form and has responses "Yes" (represented by a check mark) for the first proposed meeting time, "No" (represented by an "X" symbol) for the second proposed meeting time, "Maybe" (represented by a question mark) for the third proposed meeting time, and "Yes" (represented by a check mark) for the fourth proposed meeting time. As shown in FIG. 7, recipients roger@baydin.com and sarah@baydin.com have not yet responded to the form. The image also displays a total of "Yes" responses for each proposed meeting time, allowing the organizer and other recipients to easily see which proposed meeting time most recipients are able to attend. In some embodiments, the image shown in FIG. 7 may be shown via a reference embedded in the electronic message, such that the image may be changed without changing the content within the electronic message.

Figure 8:
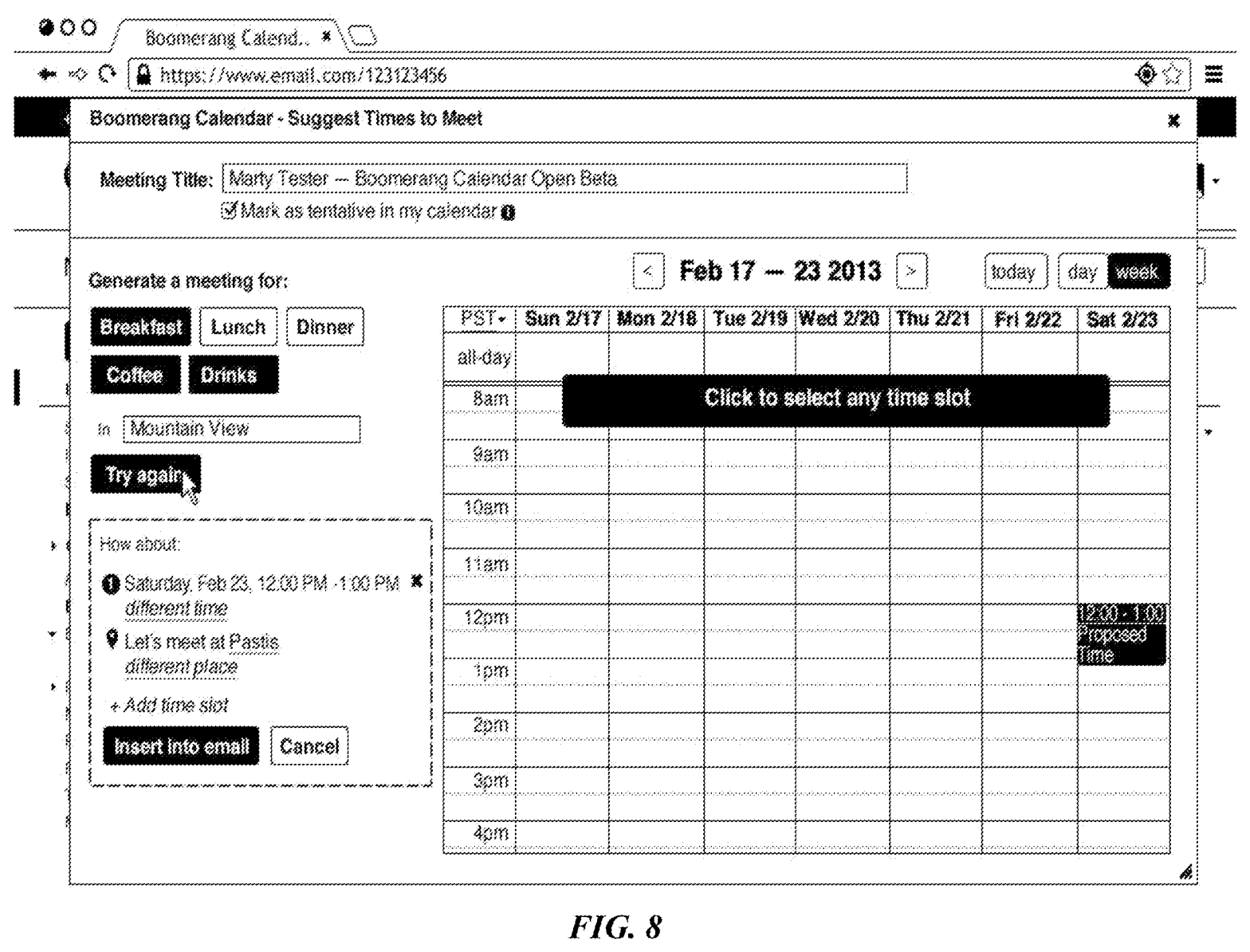

In reference now to FIG. 8, an embodiment of a method for incorporating calendar functionality into e-mail is depicted. As shown in FIG. 8, a user may create a calendar entry based, at least in part, on suggestion provided by the system. For example, and as shown in FIG. 8, a user may select from a variety of different classes of meetings, such as "Breakfast, Lunch, Dinner, Coffee or Drinks". The user is also asked to input a tentative geographic location for the meeting (in the present example, Mountain View). Based at least in part on the user's selection, and the user's preferred location, the user is offered a suggested time and place for the meeting. The suggested time may be based, at least in part, on the user's selection of a time slot, or, based on available time in the user's schedule. As shown in the example of FIG. 8, a time of Saturday, February 23 and 12:00 PM and a location of "Pastis" is suggested. In some embodiments, a user may choose what external data source is used for the suggestion of a meeting location. For example, in the example shown in FIG. 8, "Yelp" is being used as the data source. However, a user may be able to click on the "Powered by Yelp" log and choose a different provider. A user may also be able to click the "Try Again" button if they do not like the initial or subsequent suggestions. In some embodiments, rather than request that a user enter in a location for the meeting, geolocation data may be used and relied upon in suggesting a location for a meeting.

Figure 9:
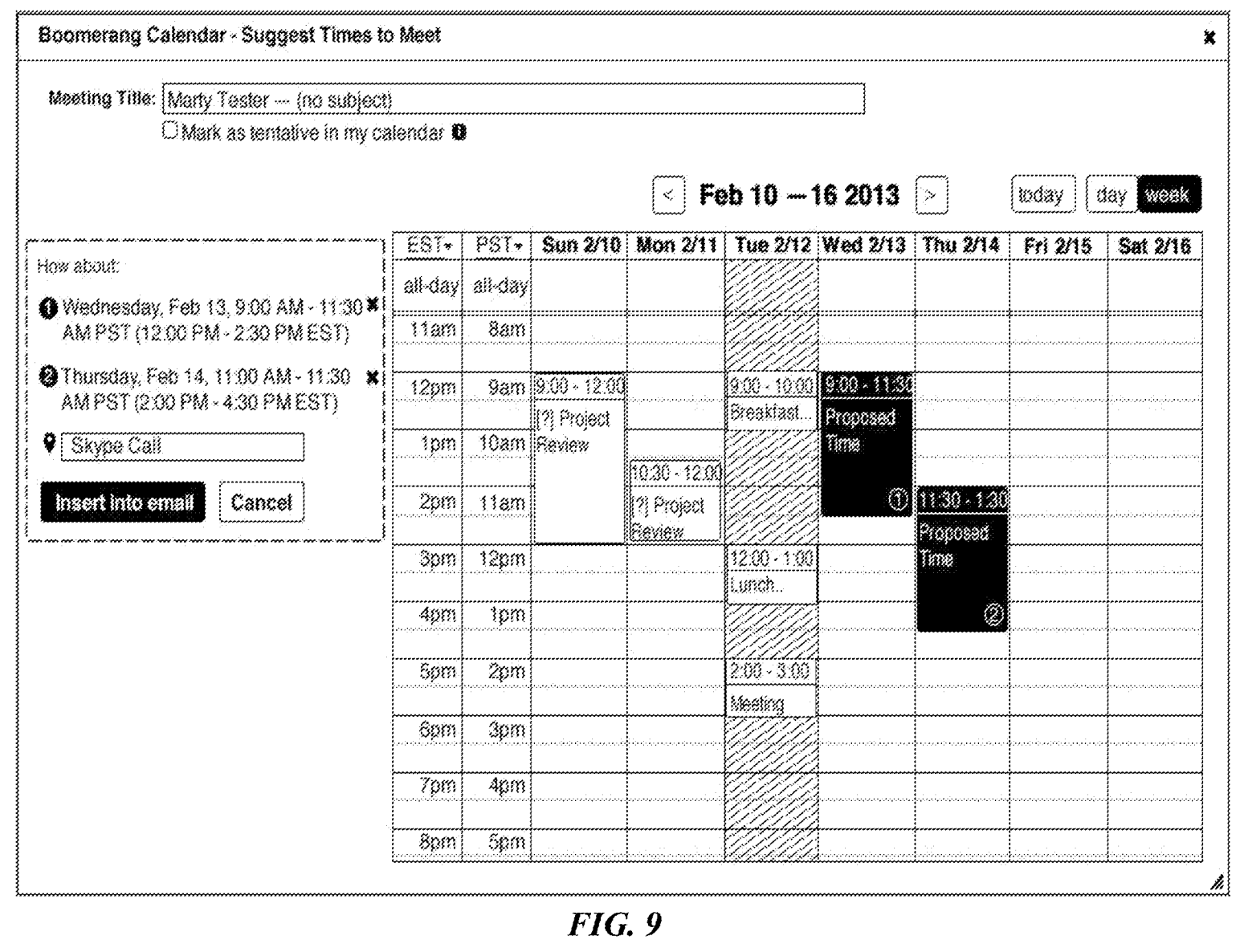

In reference now to FIG. 9, an embodiment of a method for incorporating calendar functionality into e-mail is depicted. As shown in FIG. 9 a suggested location may not be a physical location for a calendar entry, but, may rather be a description of the means for communication or a meeting format. For example, and as shown in FIG. 9, rather than a physical meeting a calendar entry may simply be for a telephone conference or video conference. In the example shown in FIG. 8, the suggested meeting format is a "Skype Call." A suggested meeting format may be suggested by the system relying at least in part on past user preferences for a meeting format. For example, in some embodiments, the system may suggest a "Skype Call" for a calendar entry involving individuals who have had a "Skype Call" in the past.

In reference now to FIG. 10, an embodiment of a method for incorporating calendar functionality into e-mail is depicted. As shown in FIG. 10 the system may generate a message to prospective recipients based at least in part on the suggestions for the calendar entry provided by the system. For example, if a user were to click on the "Insert into email" button shown in FIG. 9, they may be presented with the draft electronic message shown in FIG. 10. The suggested time, and the suggested meeting format (which may sometimes be referred to as the meeting "location" when the meeting is not a physical meeting) has been inserted into the electronic message as shown in FIG. 10. In some embodiments, the suggestion of a meeting format may rely, at least in part, on a determination that the prospective attendees are in different physical locations, or are in different time zones.

In reference now to FIG. 10, an exemplary embodiment of the present disclosure is depicted that facilitates the development of calendar entries for attendees across multiple time zones. As shown in FIG. 10, a user who desires to create a calendar entry involving attendees from across different time zones can easily see the differing time zones in the first two columns of the chart as shown (The Eastern Time Zone (EST) and the Pacific Time Zone (PST)).

Figure 11:
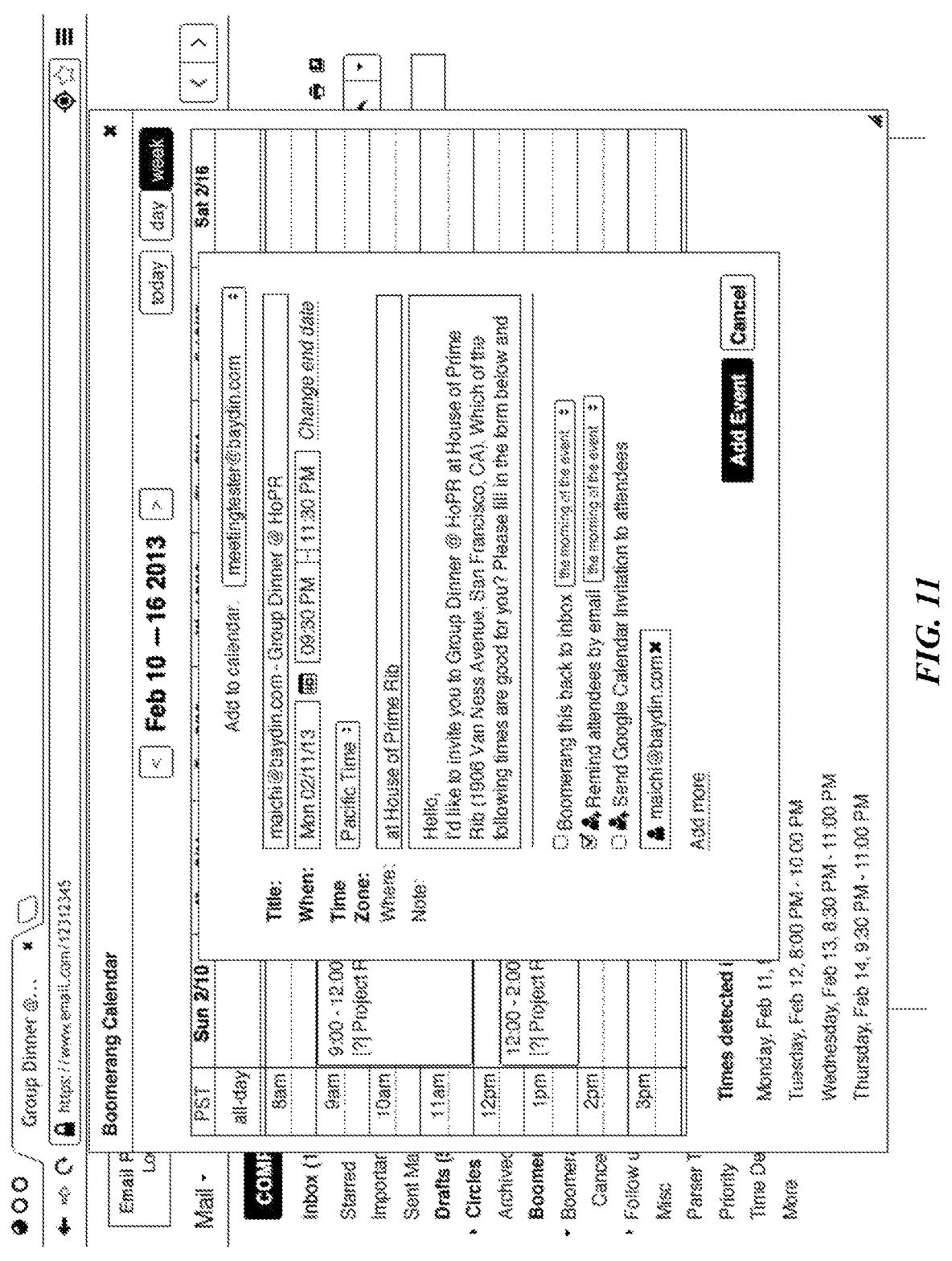

In reference now to FIG. 11, an exemplary embodiment of the present disclosure is depicted that provides for sending automatic electronic messages that serve as reminders for a calendar entry to all individuals associated with a particular calendar entry. As shown in FIG. 11, when a user is finalizing a calendar entry, they have the option of selecting the "Remind attendees by e-mail" option. By selecting this option, an electronic message will automatically be generated that will remind all individuals associated with the calendar entry that the meeting will occur. In some embodiments, a default time for the reminder message is provided to the user. In some embodiments, the default time may be determined based at least in part on the content of electronic messages associated with the calendar entry. In some embodiments, the default time may be determined based at least in part on the content of the calendar entry.

Figure 12:
FIG. 12 is an exemplary user interface demonstrating the incorporation of calendar functionality into an electronic message.

In reference now to FIG. 12, an exemplary embodiment of a method for incorporating calendar functionality into e-mail is depicted. As shown in FIG. 12, a user (who may be referred to as an "organizer") has initiated the composition of an electronic message to Roger Jones with the subject "Project Review". A user may select or click on an icon, button, menu item or link that allows the user to initiate the process for creating of a calendar entry by suggesting tentative time periods for a new calendar entry to one or more recipients of an electronic message. This is depicted in FIG. 12 by a user selecting or clicking on a button or icon for suggesting a meeting. In some embodiments, and as depicted in FIG. 12, the option to suggest a meeting may be made available from a user interface used to compose an electronic message. In some embodiments, the option to suggest a meeting need not be provided to the user from the user interface utilized to compose an electronic message. For example, the option to select a meeting can be provided from a user interface displaying an inbox for the user, or from a menu made available anywhere else in the electronic communication system.

In some embodiments, when an organizer selects an option to initiate the creation of a calendar entry by, for example, suggesting a meeting, the system retrieves calendar information from the organizer's electronic calendar system and displays the retrieved calendar information to the organizer. In some embodiments, the organizer's electronic calendar system may be part of the same electronic communication system that the organizer relies upon for electronic messages, while in other embodiments the organizer's electronic calendar system may be different from the electronic communication system that the organizer relies upon for electronic messages. The organizer's calendar information may be retrieved via any protocols, application programming interfaces, software development kits, function calls, procedures, or any other means of access made available by the organizer's electronic calendar system. In some embodiments, calendar information for a specific predetermined amount of time is retrieved. The organizer may be provided with the option to specify the specific time periods for which calendar information should be retrieved. In some embodiments, the retrieved calendar information includes information relating to the organizer's availability and/or unavailability for certain time periods. In some embodiments, the retrieved calendar information may relate to a specific number of calendar entries associated with the organizer. In some embodiments, calendar information for a predetermined number of days is retrieved. In some embodiments, the retrieved calendar information may depend, at least in part, on a determination that natural language in a draft message composed by the organizer relates to calendar functionality. For example, a draft message that refers to potentially meeting "next week" could result in retrieving calendar information for the upcoming week relative to the day the message is being composed.

Figure 13:
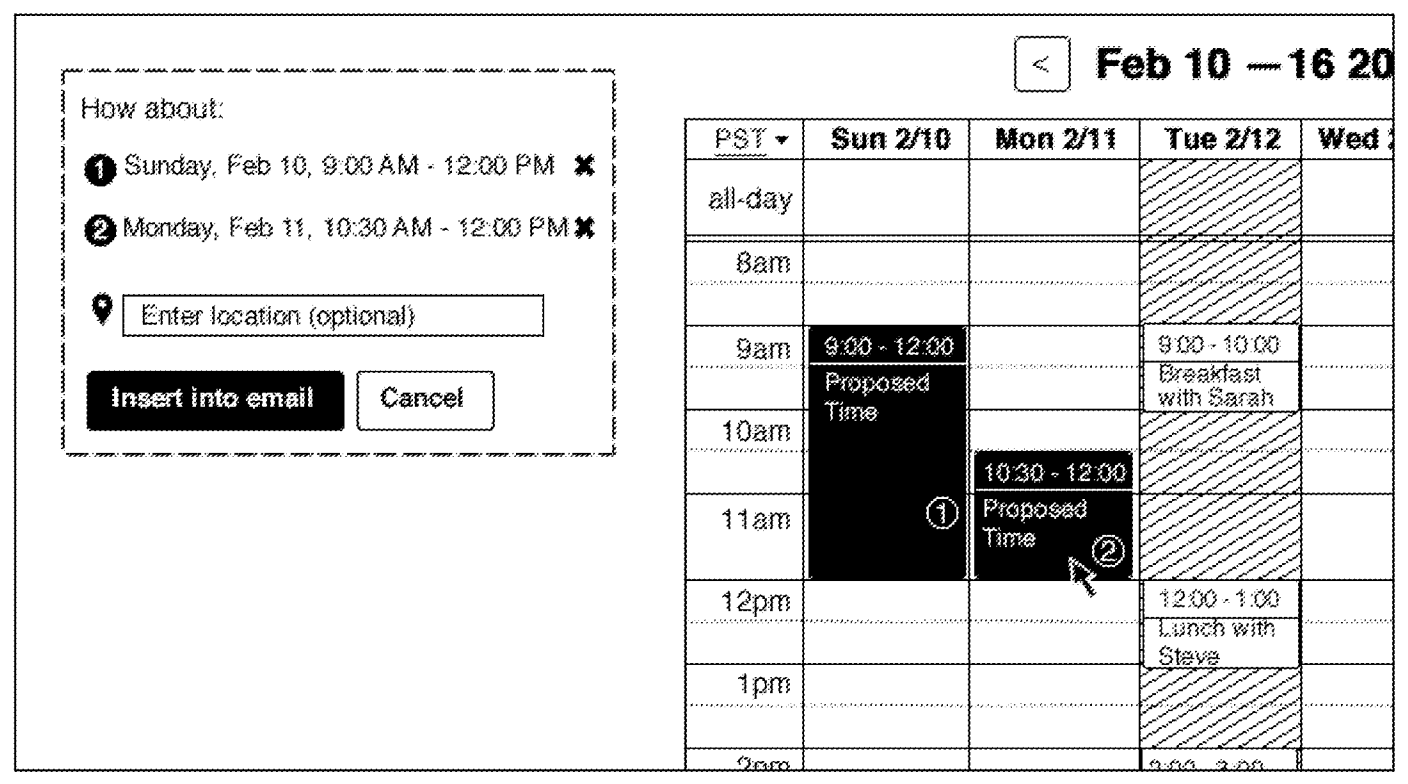

In reference now to FIG. 13, an exemplary embodiment for further incorporating calendar functionality into e-mail is depicted. After initiating the creation of a calendar entry by, for example, suggesting a meeting, an organizer may be presented with retrieved calendar information as depicted in FIG. 13. As shown in FIG. 13, calendar information for a series of days is provided to the organizer (Sunday February $10^{th}$ through Wednesday February $13^{th}$). The retrieved calendar information demonstrates that the organizer is generally free on Sunday February 10, Monday February $11^{th}$, and Wednesday February $13^{th}$, but that the organizer is unavailable on Tuesday February $12^{th}$ due to "Breakfast with Sara" and "Lunch with Steve" in addition to being otherwise unavailable as depicted by the additional shaded time periods on Tuesday, February $12^{th}$. One exemplary reason for the organizer's unavailability on Tuesday as depicted by the shaded time periods may be that the organizer is traveling on Tuesday and is generally unavailable due to being out of the office, notwithstanding the fact that they might be meeting with Sarah and or Steve for breakfast and lunch while traveling. In some embodiments the system may display calendar entry information, such as an individual's availability or unavailability, for individuals besides the organizer. For example, the when an organizer is provided with a display of his own availability from which to select tentative time periods, the organizer may also be presented with availability information for other users. In one example, the organizer may be presented with information representing the calendar entries of a recipient to whom the organizer intends to send an electronic message suggesting a meeting. The representation of the recipient's availability may be determine based on information in the recipient's electronic communication and/or calendar system.

Once calendar information reflecting the organizer's availability is retrieved and displayed to the organizer as exemplified in FIG. 13, the organizer may click on time periods for which the organizer is available and for which the organizer would like to tentatively propose as the time periods for the creation of a new calendar entry for a suggested meeting. As the organizer completes his selection of time periods, text representations and/or computer-readable representations of the selected time periods may be created. As depicted in the example shown in FIG. 13, the organizer has accordingly selected the time periods that are reflected by Sunday, February 10, 9:00 AM-12:00 PM and Monday, February 11, 10:30 AM-12:00 PM as "Proposed Times" that reflect tentative time periods for the creation of a new calendar entry. An organizer may be provided with the option of removing one or more selections of time periods for a tentative new calendar entry. For example, and as depicted in FIG. 13, an organizer may be able to click on a "X" icon to remove previously selected and available time periods. As depicted in FIG. 13, once an organizer has completed his selection time periods for which he is tentatively available for the creation of a new calendar entry, information reflecting the organizer's availability for a new calendar entry may be inserted into an electronic message.

In some embodiments, once an organizer has selected tentative times for the creation of a new calendar entry (the "Proposed Times" in the example of FIG. 13), the organizer's calendar is updated to reflect a tentative engagement during the previously selected tentative time periods. For example, after the organizer in FIG. 13 completed his selection of proposed times, his calendar would have included tentative calendar entries reflecting that the organizer is tentatively unavailable during the selected time periods. In some embodiments, information relating to the tentative calendar entries, such as information relating to the title for a proposed calendar entry, the description of a proposed calendar entry, the location for a proposed calendar entry, the attendees for a proposed calendar entry, the organizer for a proposed calendar entry, notes associated with a proposed calendar entry, or any other information relating to a proposed calendar entry may be stored. In some embodiments, information relating to the tentative time periods selected by the organizer may be stored in a cache. In some embodiments, information relating to the tentative time periods selected by the organizer may be stored in a database or list apart from the organizer's underlying calendar system.

In some embodiments, and as shown in FIG. 13, the organizer may be prompted for a tentative location for the new calendar entry. In some embodiments, the system may suggest a location for the new calendar entry for the organizer. In some embodiments, the system's suggestion of a location for the new calendar entry may be based, at least in part, on information contained in a draft electronic message associated with the new calendar entry, for example, a draft electronic message that an organizer was composing when he initiated the process of creating a new calendar entry by, for example, selecting or clicking on a button or icon to suggest a meeting.

In some embodiments, the retrieved calendar information that reflects the organizer's availability may additionally reflect the availability of one or more different users (who may be referred to as recipients). For example, and with references to FIGS. 12 and 13, since the user has started composing a message to Roger Jones, the system could retrieve calendar information for both the user composing the message as well as Roger Jones. In some embodiments, time periods for which Roger Jones is unavailable may be represented differently to the user than those time periods for which the user is himself unavailable (for example, the user's unavailability could shaded in with one color, while Roger Jones's unavailability could be shaded in another color). In some embodiments, the user may have access to Roger Jones's underlying calendar information and see the actual contents of Roger Jones's underlying calendar entries (for example the title of the entry, location, and/or description for the entry) while in other embodiments the user may only be provided with limited information, such simply whether or not Roger Jones is available.

Figure 14:
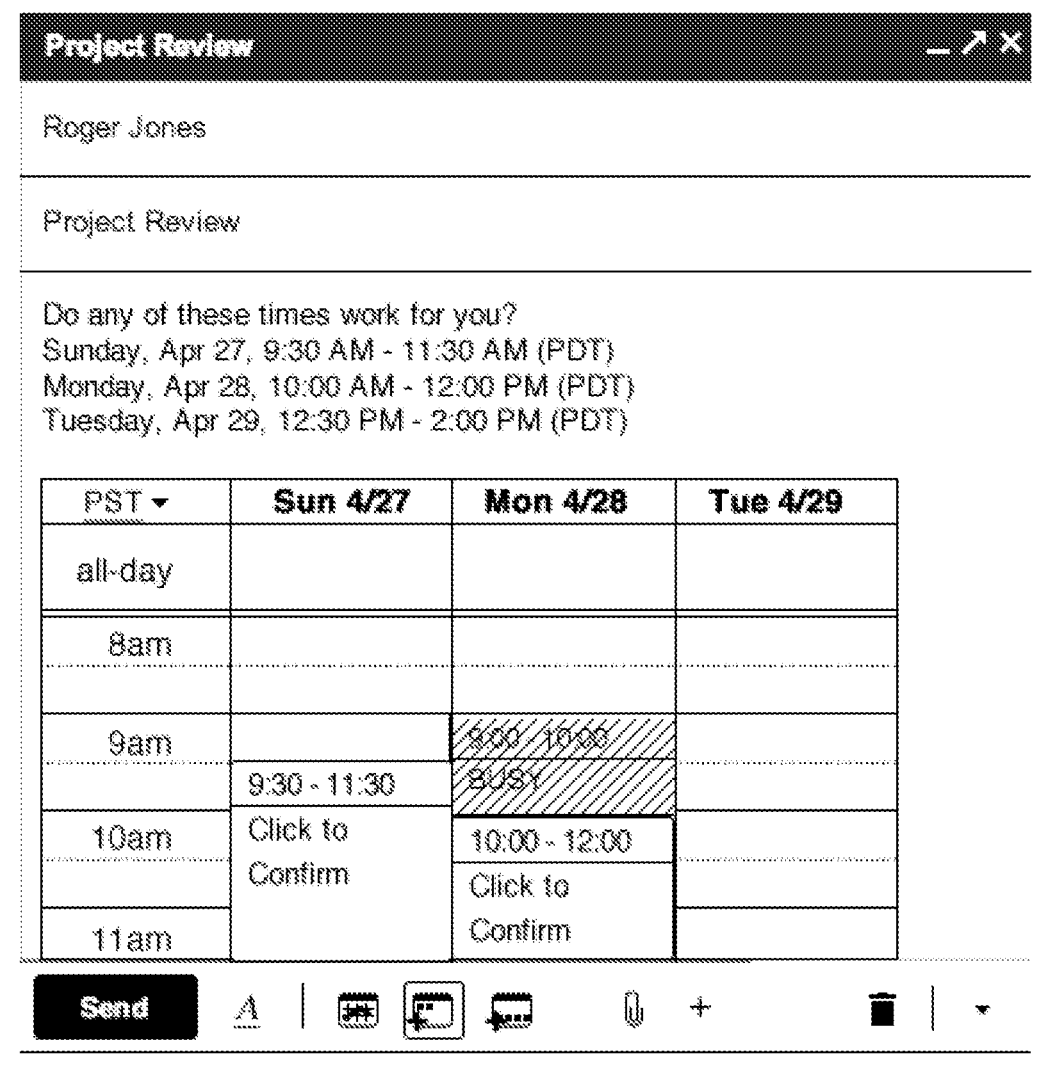

In reference now to FIG. 14, an exemplary embodiment for further incorporating calendar functionality into e-mail is depicted. As demonstrated in the example of FIG. 14, once an organizer has selected available time periods for a tentative new calendar entry, a representation of the organizer's availability may be inserted into an electronic message such as an e-mail. As depicted in the example of FIG. 14, text is automatically generated, relying at least in part on the organizer's selection of tentative time periods for a new calendar entry, asking the recipient whether the proposed time periods would work for the recipient (Roger Jones). As further depicted in the example of FIG. 14, below the text requesting whether the recipient is available on various times between Sunday, April 27$^{th}$ through Tuesday April 29$^{th}$, is a graphical representation of the tentative time periods for a new calendar entry representative of the suggested meeting. The graphical representation depicted in the example of FIG. 14 is in the form of a table, which may also be referred to as a calendar grid, that reflects days across the top and time periods along the side. The graphical representation may be any form of representation of calendar information that is not simply plain text. In some embodiments, the graphical representation may include plain text though it is not solely comprised of plaint text. For example, in embodiments where the graphical representation is a calendar grid, the graphical representation may include text reflecting the dates and information for various calendar entries. In some embodiments, the graphical representation may rely on remotely stored content that may be regularly updated. In some embodiments the graphical representation may be a single image that reflects the availability of the user proposing the creation of a new calendar entry and suggesting the meeting. In some embodiments, the remotely stored content may be comprised of one or more images. In some embodiments, the geographic representation may comprise a reference to remotely stored content, such that the geographic representation relies on the remotely stored content. In some embodiments, the remotely stored content may be comprised of HTML. In some embodiments, the graphical representation may be comprised of HTML that references one or more remotely stored images via, for example, a universal resource locator (URL). In such embodiments, the HTML may comprise an "IMAGE" or "IMG" tag that references remotely located images.

In some embodiments, the system may detect changes that affect the tentative time periods selected by an organizer. For example, the system may detect that an organizer is no longer available for a previously selected tentative time period because the organizer has scheduled a different meeting at that particular time period. In some embodiments, the remotely stored content that is relied upon by the graphical representation in an electronic message may be updated to reflect changes to the selected tentative time periods. For example, if an organizer has previously selected tentative time periods A, B, and C for a tentative meeting, but then schedules some other event in his calendar for time period C, the remotely stored content relied upon by the graphical representation can be updated to reflect that tentative time period C is no longer an option that a recipient may select. Because the content is remotely stored, when a recipient open the electronic message after the remotely stored content is updated, the recipient will not be presented with tentative time period C as an option. In this manner, the remotely stored content relied upon by the graphical representation can be dynamically updated as a user's calendar availability changes, and conflicts with previously selected tentative time periods for a meeting removed.

In some embodiments, the graphical representation of the organizer's selection of tentative time periods and/or availability may be associated with an authentication token. For example, in some embodiments where the graphical representation relies on remotely located information rather than information embedded directly into the electronic message, authentication tokens may assure that the URL for the remotely located information (for example, images) are only accessed by the intended recipient. Additionally, authentication tokens may be included in the electronic message received by the recipient so that a response by the recipient confirming one of the proposed times for the meeting can be authenticated (so that, for example, the organizer can be assured that he is receiving authenticated responses from the intended recipients to which he suggested a meeting and proposed his availability). It should be understood that the terms "authentication token", "authenticating token", "security token", "cryptographic token", "software token", "digital signature" and/or "fingerprint" may be used interchangeably to refer to a unique identifier (often a "code" or "key") that may be used to access information that is otherwise not made available to those who do not have the unique identifier. Alternatively, and throughout this disclosure, in any instance where reference is made to such unique identifiers (such as to an "authentication token") different authentication methods may be utilized. For example, authentication could be achieved through the use of cookies.

In some embodiments, the graphical representation of the user's availability may include a representation of the tentative time periods for a new calendar entry proposed by the user in the form of a range of time periods. In some embodiments the graphical representation of the user's availability may include a representation of the tentative time periods for a new calendar entry proposed by the user in the form of a range of days.

In some embodiments, the graphical representation of the user's selection of tentative time periods and/or availability may include HTML that references remotely stored content. In some embodiments, the graphical representation of the user's availability may include HTML capable of detecting one or more clicks by the recipient on the graphical representation. In some embodiments, the graphical representation of the user's availability may include an image map overlay. In some embodiments, an image map overlay may provide additional information about the tentative time periods selected by the organizer. In some embodiments, an image map overlay may allow the recipient to interact with the graphical representation when certain portions of the graphical representation are clicked. For example, a recipient may be able to click on a time period tentatively selected by the organizer in order to confirm a meeting at that particular time period. This is demonstrated in the example of FIG. 14 by the language "Click to Confirm" on the specific areas of the graphical representation demonstrating the proposed time periods from 9:30-11:30 on Sunday and 10:00-12:00 on Monday. In such embodiments, a confirmation message may be sent to the organizer confirming the selection of a time period for the creation of a new calendar entry when the recipient clicks on the area of the graphical representation representing one of the tentative time periods selected by the user. Upon receipt of this confirmation by the user, the system may remove any tentative calendar entries that were created for the time periods previously selected by the user and a non-tentative calendar entry may be created that reflects the time period confirmed by the recipient and includes information related to the new calendar entry. In some embodiments, the system may then send a representation of the new calendar entry, often referred to as a calendar invite, to the recipient.

In some embodiments, information relied upon in generating the graphical representation of a user's availability may be stored in a cache such that the graphical representation may be displayed in a faster manner. In some embodiments, cached information relied upon to generate the graphical representation of a user's availability may be dynamically updated when information relating to a user's availability changes.

In some embodiments, a recipient may be allowed to confirm his availability for multiple time periods suggested by the organizer. In such situations, a new non-tentative calendar entry may not be created until the organizer selects a final time period for the new calendar entry after receiving confirmation from the recipient that a plurality of the suggested time periods are acceptable to the recipient.

In some embodiments, an organizer may suggest tentative time periods for a new calendar entry to a plurality of recipients rather than a single recipient. Each recipient would then be able to separately confirm the time periods for which they are available for the new calendar entry. The graphical representation of the tentative time periods selected by the organizer can be dynamically updated as recipients confirm their availability for the suggested time periods. For example, in a situation where an organizer suggests a meeting to three different recipients offering a first, second and third tentative time periods for a new calendar entry, the system would work as follows: if a first recipient confirms his availability for the first and second tentative time periods but not the third, the organizer's calendar system will be updated so as to remove the third time period as a tentative time period. Accordingly, when a second recipient opens his electronic message and views the geographical representation of the available time periods for the suggested meeting, then he will only be presented with the first and second time periods, and not the third. If the second recipient were then to only confirm the first tentative time period, then the third recipient would only be presented with the first tentative time period. Notably, in some embodiments where content associated with geographical representations of tentative time periods and/or availability are stored remotely, the graphical representations can be updated dynamically such that a recipient may be presented with current and up-to-date information with regards to availability each time they open an e-mail, whether they are opening the e-mail for the first time, or re-opening it at a later date.

In some embodiments, an organizer may suggest a plurality of tentative time periods to more than one recipient. In such embodiments, a first recipient may confirm only one of the tentative time periods. The system may receive the confirmation from the first recipient, and subsequently update remotely stored content relied upon by a graphical representation so as to reflect the fact that only one tentative time period has been confirmed by the recipient. Accordingly, when a second or third recipient opens the electronic message, the graphical representation that they are presented with may only identify the single tentative time period selected by the first recipient. In some embodiments, the graphical representation may also present the previously selected tentative time periods, but in a manner that indicates that those tentative time periods have been declined by at least one other recipient. For example, the tentative time period confirmed by the first recipient may be displayed in a first color, while the tentative time periods originally selected by the organizer but not confirmed by the first recipient are displayed in a second color. The additional recipients may then be able to confirm the time periods for which they are available.

In some embodiments, the invention of the present disclosure could be used to suggest multiple meetings to multiple recipients. In some embodiments, an organizer could suggest a plurality of time periods for a plurality of meetings with different recipients. As recipients confirm their availability for different tentative time periods, recipients who subsequently open their electronic messages may only be presented with a graphical representation reflecting the tentative time periods that are still available. For example, an organizer may which to schedule three meetings, one with recipient A, one with recipient B, and one with recipient C. The organizer may suggest five different tentative time periods for those three meetings using the invention of the present disclosure. recipient A may confirm one of those five tentative time periods. Subsequent to recipient A's confirmation of a tentative time period, remotely stored content that is relied upon by the graphical representations in recipient B and recipient C's electronic messages may be updated to reflect that the tentative time period confirmed by recipient A is no longer available. When recipient B or C opens their electronic message, they are therefore presented with a graphical representation that only identifies the four remaining tentative time periods as options that they could confirm for a meeting. Similarly, if recipient B confirms one of the four remaining tentative time periods, recipient C would then only be presented with a geographic representation reflecting the 3 remaining tentative time periods.

In some embodiments, a recipient may be able to click on time periods that are not the time periods selected by the organizer, but which are otherwise not blocked-out as busy or unavailable, in order to propose an alternative time period for the new calendar entry different from the ones originally selected by the organizer. In such embodiments, the recipient may click on one or more otherwise available time periods in the graphical representation. The recipient may be asked to confirm that he desires to suggest a new time period for the new calendar entry different from the selections previously made by the organizer. In some embodiments, when a recipient suggests a different time period for a new calendar entry that was not previously suggested by the organizer, the organizer may receive a message similar to the message displayed in FIG. 15 rather than a confirmation that a recipient has selected one of the time periods proposed by the organizer.

In some embodiments, rather than rely on a user's primary electronic communication system to compose an electronic message into which a graphical representations of a user's availability is inserted, a separate system may instead generate and subsequently send an electronic message that contains a geographical representation of tentative time periods for a new calendar entry or, more generally, a user's availability.

Figure 15:
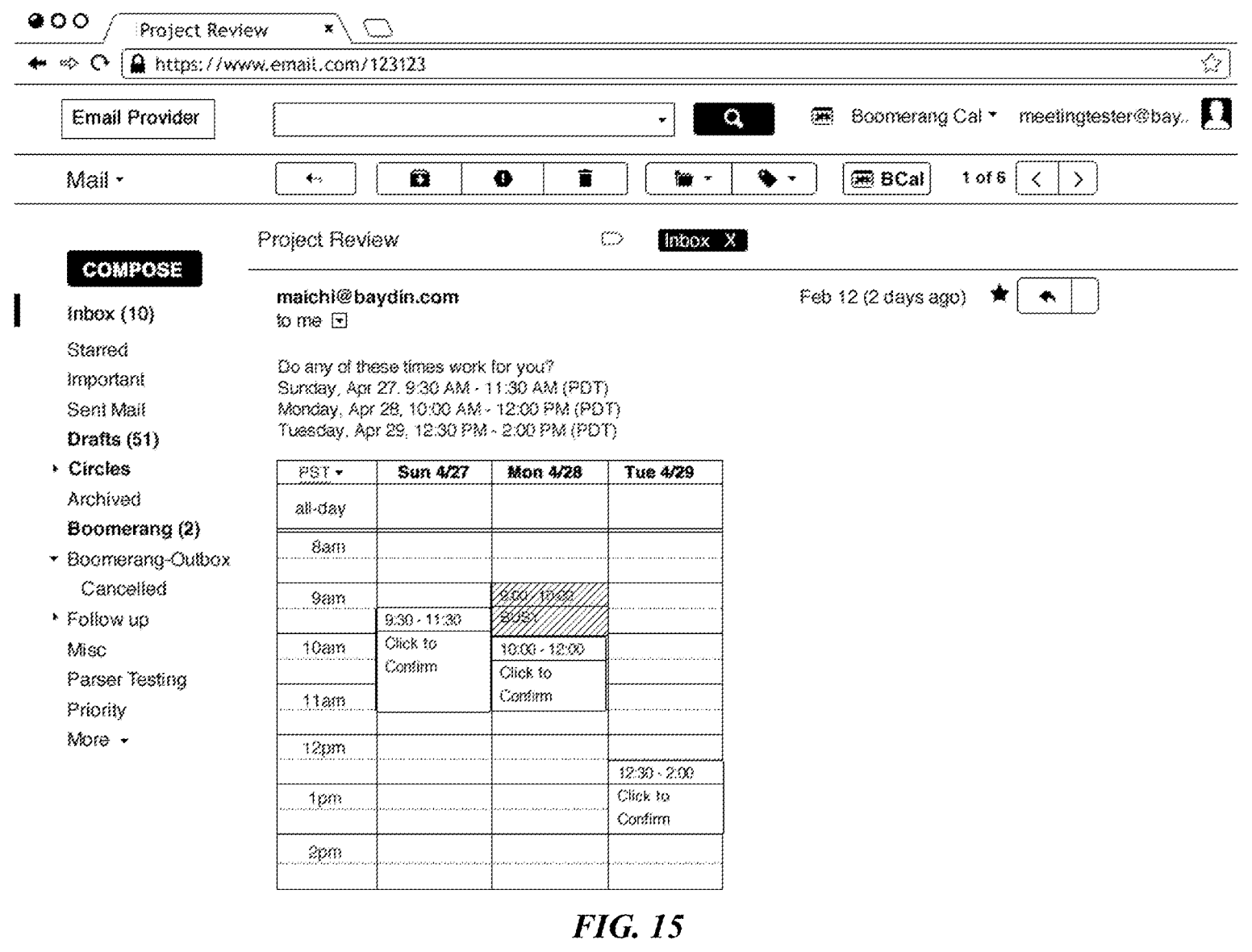

In reference now to FIG. 15, an exemplary embodiment for further incorporating calendar functionality into e-mail is depicted. As shown in FIG. 15, a recipient may open an electronic message sent by, or on behalf of, the organizer which includes a graphical representation of tentative time periods for a new calendar entry selected by the organizer. In the example of FIG. 15, the recipient has opened an electronic message sent by organizer "maichi@baydin.com". The electronic message displays both a textual representation of the tentative time periods for a new calendar entry selected by the organizer (the three lines below the statement "Do any of these times work for you?") and a graphical representation of the tentative time periods for a new calendar entry selected by the organizer (the table, also known as a calendar grid, demonstrating the selected time periods with the words "Click to Confirm" on the selected time periods). In some embodiments, the selected time periods may be presented in a color scheme different than the colors utilized for other available or busy time periods. For example, in the table provided in FIG. 15, the time periods selected by the user could be filled in blue with white text, while busy times could be shaded in in dark grey. Remaining times for which the organizer may otherwise be available but has not selected as time periods for the tentative new calendar entry may be presented in a neutral or background color, such as white or beige. It would be appreciated that any variety of color combinations that could effectively distinguish the tentative time periods from otherwise busy or open time periods could be utilized.

In some embodiments, the recipient may not be utilizing the same electronic communications system as the organizer. For example, the organizer could be utilizing GOOGLE's GMAIL service while the recipient is utilizing MICROSOFT's OUTLOOK and/or EXCHANGE products. In such situations, the recipient would nonetheless be able to view and interact with the graphical representation of tentative time periods for a new calendar entry because the graphical representation has been included in the electronic message. In some embodiments, while the graphical representation may be displayed in the electronic message it is comprised of content that is actually stored remotely and not itself included in the underlying electronic message. In some embodiments, this remotely located content is retrieved by references to said content that are included in the electronic message. For example, in some embodiments HTML may be used in the electronic message that includes URLs to remotely located content that may be freshly loaded each time a user opens or reopens an electronic message. In such situations, when the user opens, or re-opens, the e-mail message, a fresh copy of the remotely located content (which may or may not include one or more images) may be retrieved from the remotely located source. The remotely located content may be regularly updated as the organizer (or additional recipients) modify their selection of tentative time periods, or create additional calendar entries that might otherwise make them busy or unavailable for certain periods of time. In this way, the system may generate an updated, or real-time, display of the organizer's selection of tentative time periods for a new calendar entry as well as an updated, or real-time, display of the organizer's overall availability.

In some embodiments, HTML in the electronic message may additionally be utilized so as to provide interactive capabilities to the recipient. For example, the HTML may provide for detecting when a recipient clicks on one or more time periods in order to confirm his availability of those time periods back to the organizer. In such a situation, a confirmation may immediately be sent to the organizer, or the recipient may be allowed to review or edit the confirmation before sending. In some embodiments, a confirmation may be an electronic message that is sent back to the organizer and/or the organizer's electronic communication system and/or calendar system and/or any other programs, software, applications, or plug-in operating in conjunction with the organizer's electronic communications system and/or calendar system. In some embodiments, a confirmation may be a command or set of data that is sent to the organizer's electronic communications system, calendar system, and/or any other programs, software, applications, or plug-in operating in conjunction with the organizer's electronic communications system and/or calendar system.

Figure 16:
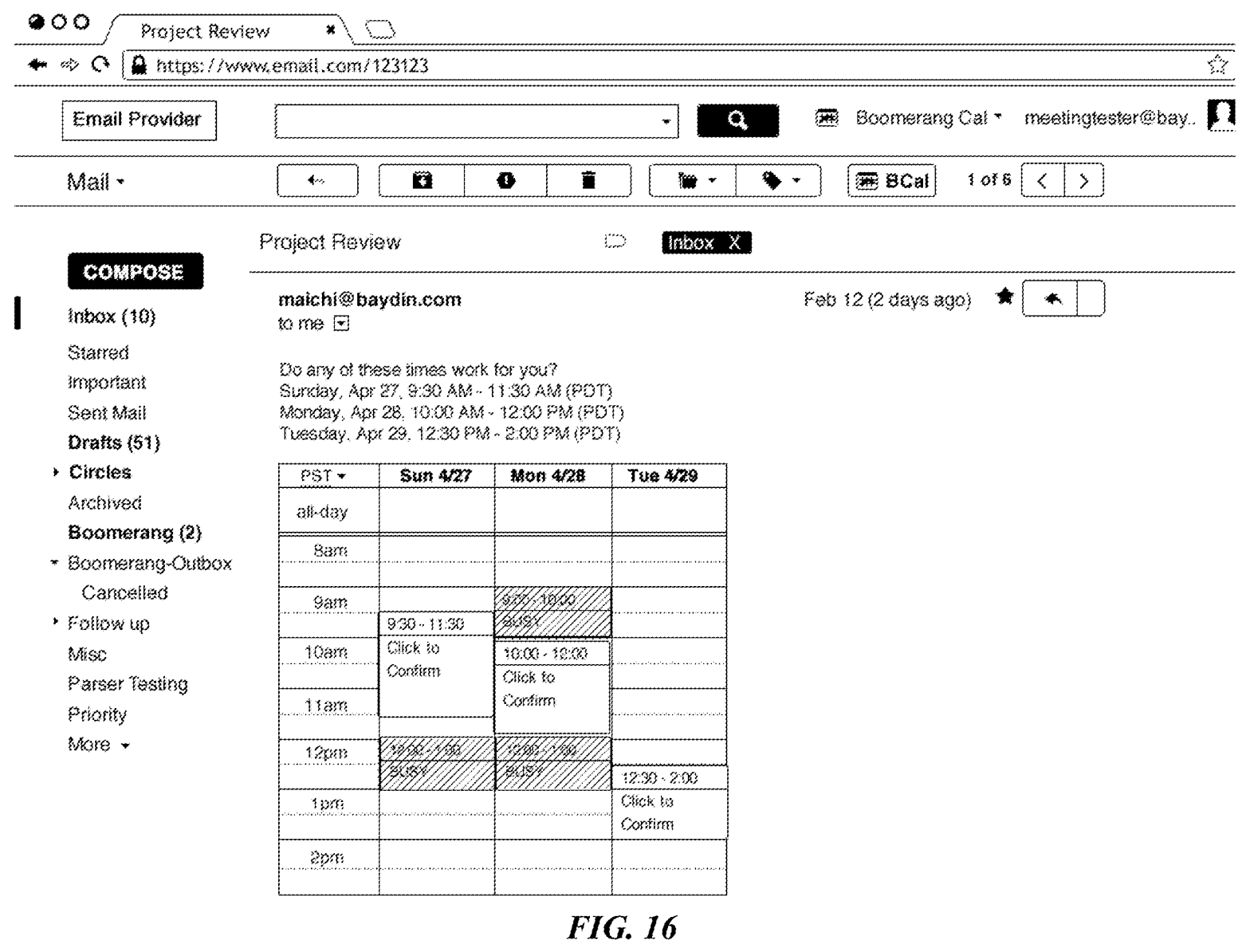

In reference now to FIG. 16, an exemplary embodiment for further incorporating calendar functionality into an electronic message is depicted. As demonstrated in FIG. 16, a recipient may refresh or re-open an electronic message received from an organizer that includes a graphical representation of the organizer's selection of tentative time periods for a new calendar entry and/or the organizer's general availability. As shown in exemplary FIG. 16, if the organizer's calendar information has changed, the graphical representation included in the electronic message will be dynamically updated to reflect any changes to the organizer's calendar information. In some embodiments, such changes may occur when any other recipients confirm, deny, or propose alternative tentative time periods for a new calendar entry. In the example shown in FIG. 16, one can see that the organizer has become unavailable between 12:00 PM and 1:00 PM on Sunday and Monday and that the graphical representation demonstrated in FIG. 16 and been updated with respect to the graphical representation previously displayed to the recipient in FIG. 15. While not demonstrated in FIG. 16, if the organizer had become unavailable for one of the previously proposed tentative time periods for a new calendar entry, that tentative time period could have been removed from the graphical representation provided the recipient.

For example, if the organizer became unavailable from 10:00 AM to 12:00 PM on Monday, the tentative time period currently shown on FIGS. 15 and 16 from 10:00 AM to 12:00 PM on Monday would be removed and could be instead reflected as a "busy" or "unavailable" time period. Accordingly, the recipient would also not be provided with an option to click and confirm this now unavailable time period.

In some embodiments, an alert may be provided to the recipient while the electronic message is open indicating that the organizer's availability has changed and suggesting that the recipient refresh or re-open the electronic message in order to view the updated availability. In some embodiments, an alert may be provided to the recipient that the organizer's availability or tentative selection of time periods for a new calendar entry has changed followed by an automatic update to the electronic message. In some embodiments, no alert may be provided and the recipient's display of information relating to the organizer's selection of tentative time periods and/or the organizer's general availability may be automatically updated while the recipient has the electronic message open.

Figure 17:
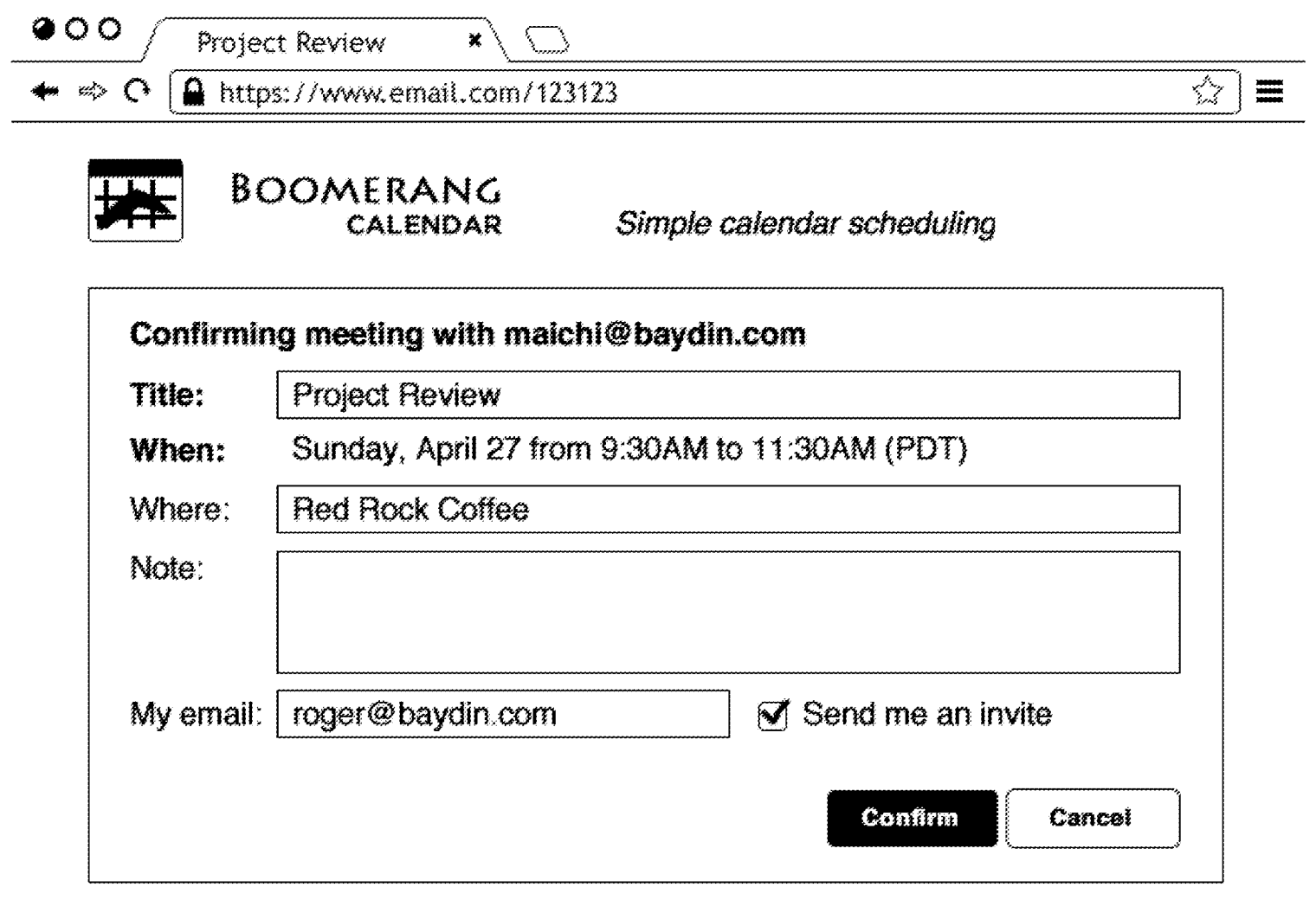

In reference now to FIG. 17, an exemplary embodiment for further incorporating calendar functionality into an electronic message is depicted. As demonstrated in FIG. 17 a recipient may be presented with the option of making edits to a confirmation prior to sending the confirmation to an organizer after he clicks on a tentative time period for a new calendar entry in order to confirm that that time period for the creation of a new calendar entry. The confirmation may be any form of electronically stored information that relates to the new calendar entry that the organizer intended to create. In some embodiments, the confirmation may be an electronic message, such as an e-mail. In some embodiments, the confirmation may be a calendar invite. In some embodiments the confirmation may be a set of data reflecting information relating to the new calendar entry to be created. In some embodiments, the confirmation may itself be a copy of a calendar entry that could be then saved or added to user's calendars. In some embodiments, the confirmation may be a command sent back to the organizer's electronic communication system, electronic calendar system, and/or any related applications, programs, software, or plugins working in conjunction with the organizer's electronic communication system and/or calendar system.

In some embodiments, once the confirmation is received by the organizer the calendar entry is automatically created in the organizer's calendar. Tentative selections of time periods for the new calendar entry may then be cleared. In some embodiments, an invite for the meeting may then be automatically sent to the recipient once the new calendar entry has been created. In some embodiments, an organizer may have sent a message with tentative time periods for a new calendar entry to a plurality of recipients. In those situations, a new calendar entry might not be created until all recipients have confirmed. In some embodiments involving multiple recipients, a new calendar entry may not be created until all recipients who have been designated as "required" recipients have confirmed, but confirmation from recipients who have not been designated as "required" may not be necessary. In some embodiments involving multiple recipients, tentative time periods for the new calendar entry originally selected by the organizer may be released and cleared as more recipients confirm that only certain time periods would work for the new calendar entry.

In some embodiments, the confirmation includes authenticating features such that the organizer and/or the organizer's electronic communication system can authenticate that the confirmation was actually sent by the intended recipient of the original message sent by the organizer. For example, the confirmation can include an authenticating token that was included with the original message sent by the organizer. In some embodiments, the confirmation can include information relating to the authenticating token that was included with the original message sufficient to demonstrate that the confirmation is authentic. In some embodiments, the confirmation may include other information sufficient to authenticate the confirmation.

As shown in the example of FIG. 17, a recipient may be provided with the option of changing the title for the confirmation and the location for the proposed calendar entry. As further demonstrated in FIG. 17 the recipient may also include additional information relating to the new calendar entry, such as a note or a tentative description for the new calendar entry. The user may also elect to change his contact information for future correspondence, and elect whether or not to automatically receive a calendar invite for the new calendar entry.

Information displayed in the confirmation dialog box exemplified in FIG. 17 may be pre-loaded based, at least in part, on information previously provided by the organizer or stored in the organizer's calendar system. In some embodiments, the confirmation dialog box could be populated with information based, at least in part, on the contents of the original message sent by the organizer. In some embodiments, the confirmation dialog box could be populated with information based, at least in part, on the contents of prior communications between the organizer and one or more recipients. In some embodiments, such information may consist of metadata that could have been provided with the original electronic message sent by the organizer, stored by the organizer and/or the recipient's electronic communication and/or calendar system, or third-party software, applications, programs, or plug-ins operating in conjunction with any of the organizer's and/or the recipient's electronic communication and/or calendar system.

Figure 18:
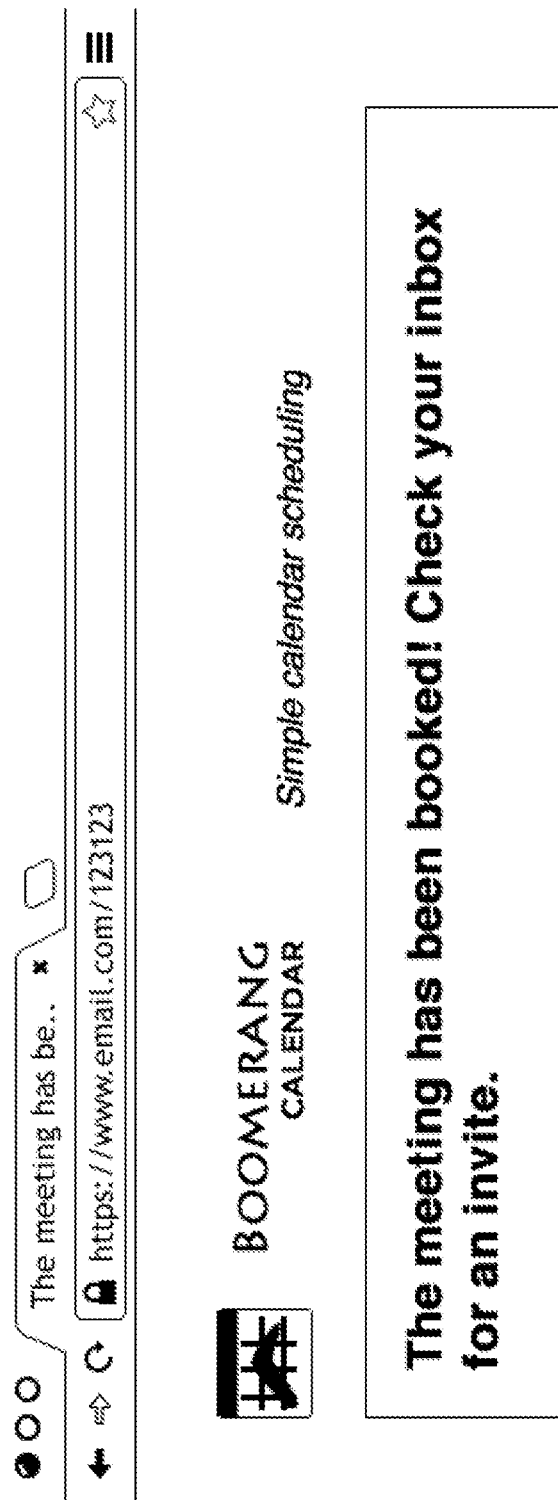
FIG. 18 is an exemplary user interface demonstrating the incorporation of calendar functionality into an electronic message.

In reference now to FIG. 18, an exemplary embodiment for further incorporating calendar functionality into e-mail is depicted. As shown in FIG. 18, a recipient may be provided with an alert that his confirmation have been sent and/or that a new calendar entry has been created. In some embodiments, the alert may include a statement describing how a calendar invite for the new calendar entry has been sent to the recipient. In some embodiments, a new calendar entry may be automatically created in the recipients electronic calendar system as opposed to an invite being sent.

Figure 19:
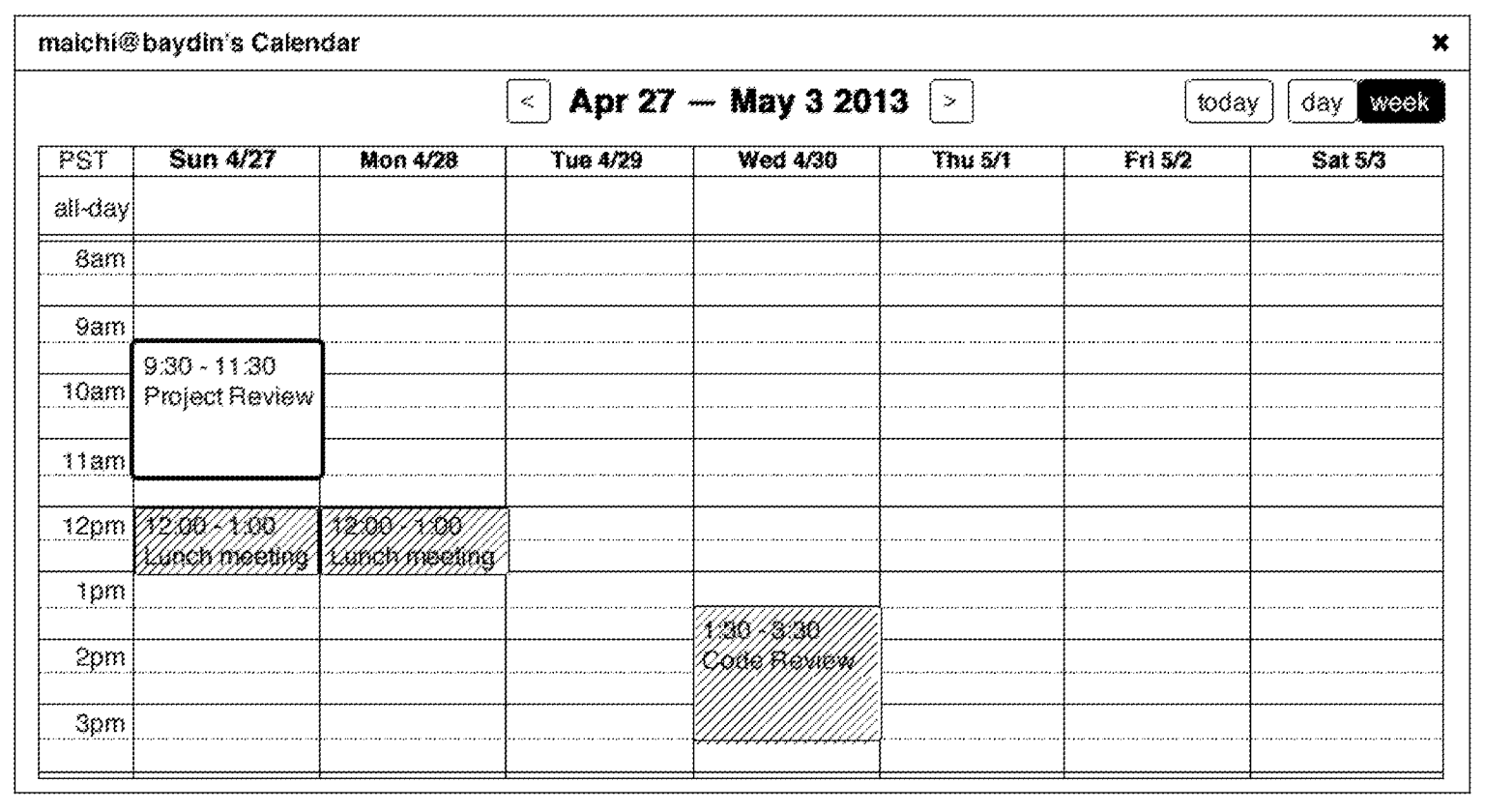

In reference now to FIG. 19, an exemplary embodiment for further incorporating calendar functionality into e-mail is depicted. As demonstrated in FIG. 19 the organizer's calendar is updated to reflect that the new calendar entry has been created (the entry for a "Project Review" from 9:30 AM to 11:30 AM on Sunday). As reflected in the example of FIG. 18, the tentative time periods previously selected by the organizer have been cleared from the organizer's calendar.

Figure 20:
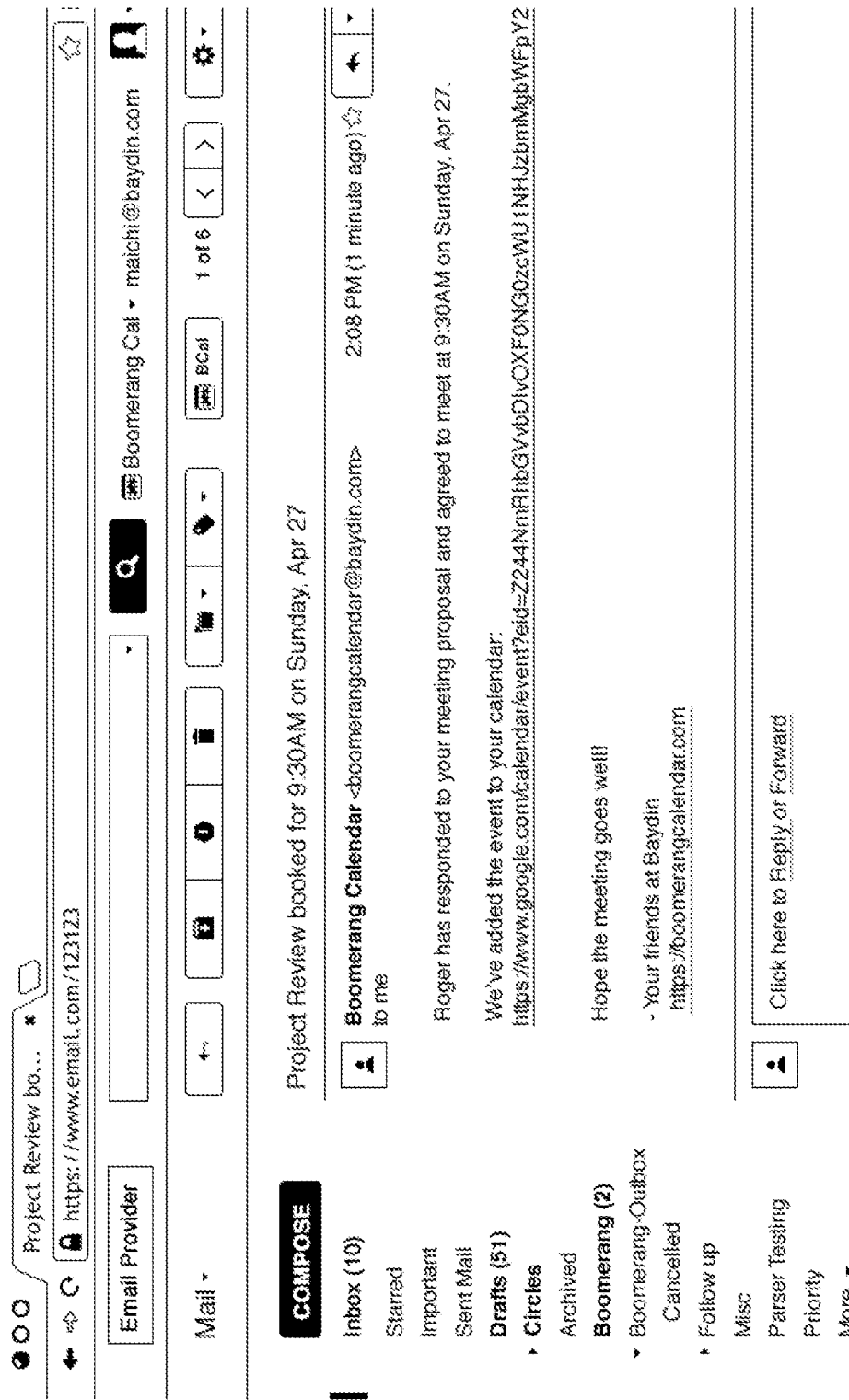
FIG. 20 is an exemplary user interface demonstrating the incorporation of calendar functionality into an electronic message.

In reference now to FIG. 20, an exemplary embodiment for further incorporating calendar functionality into e-mail is depicted. In some embodiments, and as depicted in FIG. 20, the organizer may receive an e-mail message alerting the organizer to the recipient's confirmation for a new calendar entry. In some embodiments, this e-mail message may itself comprise the confirmation. In some embodiments, this e-mail message may include a link to the organizer's calendar so that they can view and/or modify the newly created calendar entry. In some embodiments, this e-mail may itself contain information and details about the new calendar entry (for example, the title, time, location, and/or description for the new calendar entry). In some embodiments, the e-mail may be an e-mail received directly from the recipient. In some embodiments, the e-mail may be an e-mail received from an electronic communication and/or calendar system, or any programs, applications, software, or plugins operating in conjunction with an electronic communication and/or calendar system.

Figure 21:
FIG. 21 is an exemplary user interface demonstrating the incorporation of calendar functionality into an electronic message.

In reference now to FIG. 21, an exemplary embodiment for further incorporating calendar functionality into e-mail is depicted. As demonstrated in FIG. 21, a user of an electronic communication system who is composing an electronic message may desire to share his overall calendar availability for a particular period of time with one or more recipients. In the example of FIG. 21, said user may click on a button or icon from a user interface used for composing electronic messages. In the example of FIG. 21, such a button or icon is labeled "Share Availability." It should be appreciated that a user's ability to initiate the process for sharing his availability need not originate from within the user interface for composing an electronic message. In some embodiments, a user could initiate the process for sharing his availability for any menu or interface commonly made available by an electronic communication and/or calendar system. For example, a user could initiate a request to share his or her availability from a drop-down menu item made available from the user interface that displays an inbox for a user.

Figure 22:
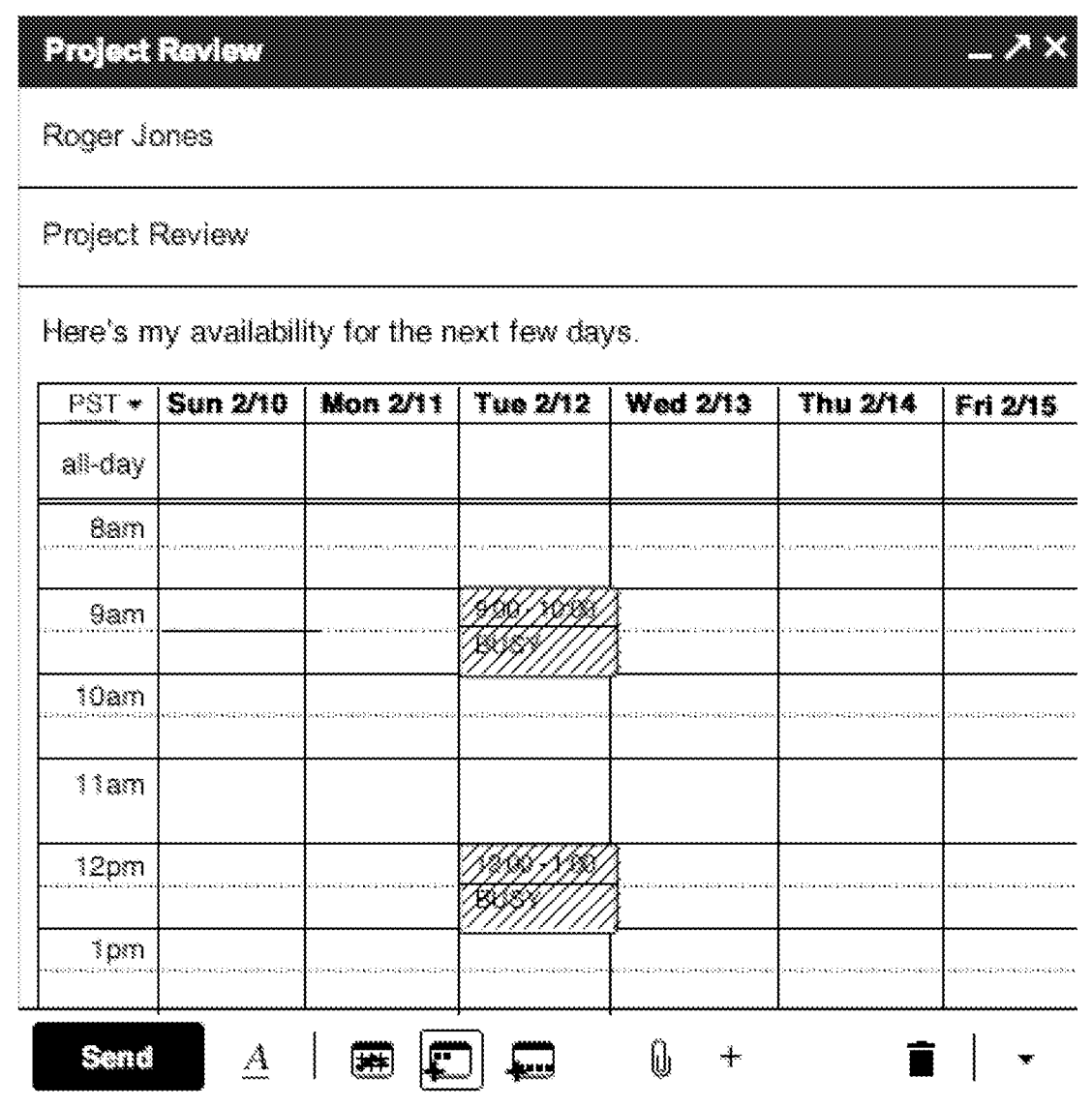

In reference now to FIG. 22, an exemplary embodiment for further incorporating calendar functionality into e-mail is depicted. As demonstrated in FIG. 22, once a user initiates the process of sharing his availability by, for example, clicking on a button, icon, menu item, or link to do so, the user is provided with a display of calendar entries from their electronic calendar system for a certain period of time. In some embodiments, the period of time may be a default period of time, such as one week from the day the user initiated the process of sharing his availability. In some embodiments, the user may specify the period of time to be shared. In some embodiments, the system may provide a dialog box to the user in order to allow him to select a specific period of time to share. In some embodiments, the system may provide a user with the option to share full details with regards to his or her availability. In some embodiments, the system may provide a user with the option to only share limited information with regards to his or her availability. For example, a user may elect to only share whether or not he is available at certain times, without revealing the underlying information about the calendar entries (such as title, location, and description). In some embodiments, the user may elect to share some information, but not all information, associated with the underlying calendar information (such as the title of events, but not the location or description). In some embodiments, the user may elect to share more information about certain calendar entries but not others. For example, the user may elect to share full details for a few calendar entries, but only limited details for others, while sharing only whether he is or is not available for other calendar events.

As demonstrated in FIG. 22, a graphical representation of the user's availability may be inserted directly into an electronic message that can be sent to one or more recipients. In the example of FIG. 22, a user is sending a recipient (Roger Jones) an e-mail entitled "Project Review" which includes a graphical representation of the user's availability for a certain week, demonstrating the user is unavailable between 9:00 AM and 10:00 AM on Tuesday as well as between 12:00 PM and 1:00 PM on Tuesday. In the example of FIG. 22, the user has elected not to share details about the calendar entries that are rendering him unavailable. In some embodiments, the system may not share details about the underlying calendar entries by default.

In some embodiments, the graphical representation of a user's availability may be a calendar grid or table as demonstrated in FIG. 22. In some embodiments, the graphical representation of a user's availability may provide information relating to multiple days, time periods within a single day, time periods across a plurality of days, time periods across a plurality of weeks, time periods across a plurality of months, etc. In some embodiments, the system may automatically generate and send an e-mail message after receiving a request by a user to share his availability, rather than having a graphical representation of the user's availability inserted into an e-mail that the user is composing as depicted in FIG. 22.

In some embodiments, a graphical representation of a sender's availability may additionally reflect the availability of one or more users. For example, in some embodiments, a sender may desire to not only share his availability but also the availability of one or more additional users. In such embodiments, a sender may select one or more users whose availability he would also like to share. The remotely stored content that is relied upon to generate the graphical representation of the sender (and other users) availability may then be updated as changes to the availability of the sender (and other users) occurs.

Figure 23:
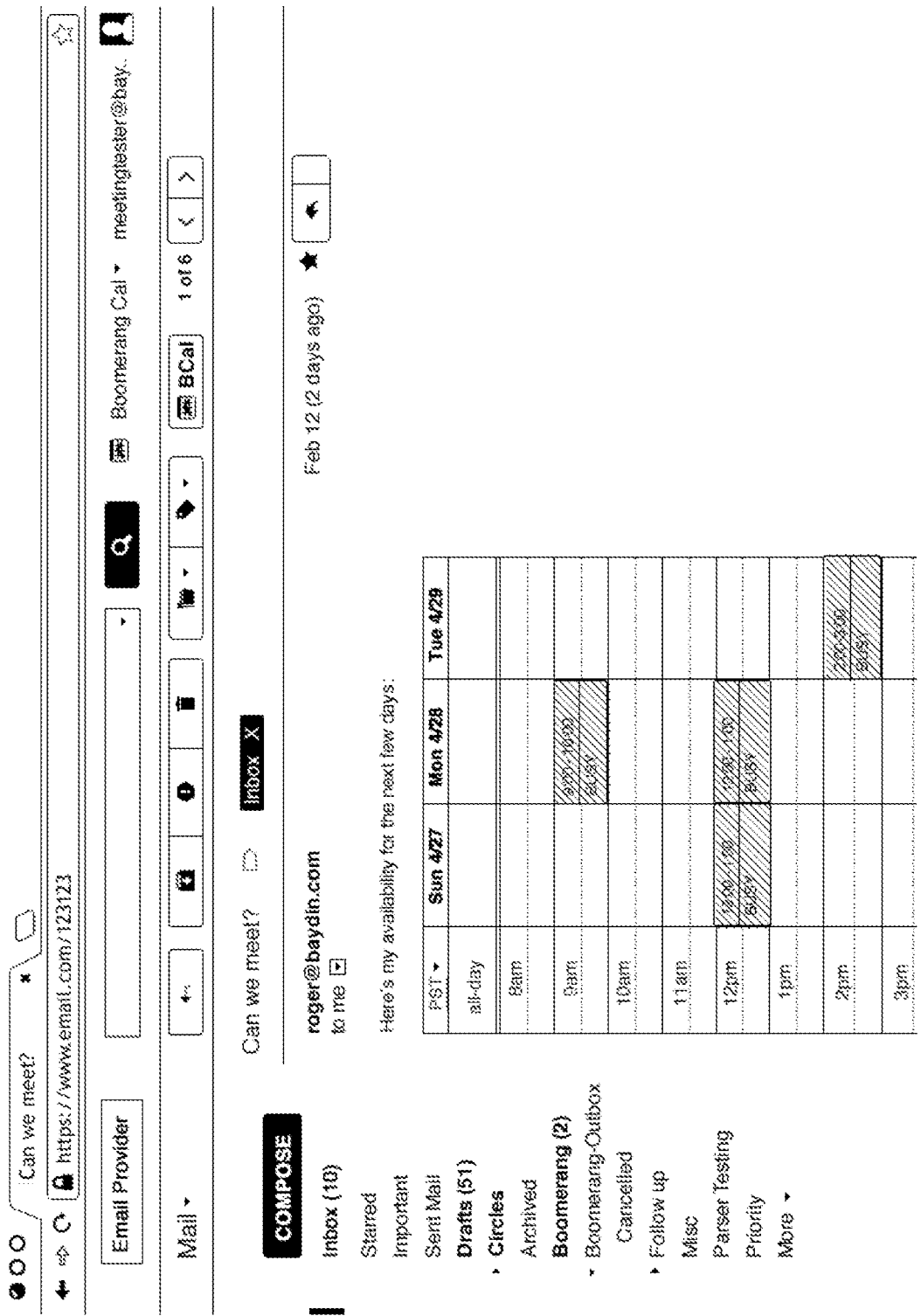
FIG. 23 is an exemplary user interface demonstrating the incorporation of calendar functionality into an electronic message.

In reference now to FIG. 23, an exemplary embodiment for further incorporating calendar functionality into e-mail is depicted. As demonstrated in FIG. 23, a recipient may receive an electronic message that includes a graphical representation of a user's availability. In the example of FIG. 23, user "roger@baydin.com" is sharing a graphical representation of his availability, which demonstrated that he is busy at certain times. In some embodiments, the graphical representation of a user's availability relies on content that is remotely stored and not included in the message. In such embodiments, the remotely stored content can be updated so as to reflect an up-to-date representation of the user's availability. In some embodiments, the electronic message sent to a recipient may include a reference to remotely stored content that is used to generate the graphical representation of a user's availability. In some embodiments, the electronic message may include HTML that refers to remotely stored content. In some embodiments, the electronic message may contain one or more URLs to remotely stored content. In some embodiments, the remotely stored content may be comprised of one or more images. In some embodiments the HTML utilized to refer to the remotely stored content may include one or more "IMAGE" or "IMG" tags that refers to one or more images that are relied upon to generate the graphical representation of the user's availability. In some embodiments, the remotely stored content relied upon to generate the graphical representation of the sender's availability may be stored in a cache in order to provide for faster retrieval. In such embodiments, the cached content may be updated as the underlying calendar information for the sender is updated.

In some embodiments, the electronic message received by the recipient may contain an authenticating token that is required in order to access remotely stored content that is relied upon to generate the graphical representation of the user's availability. This helps reduce the risk that someone besides the recipient will be able to access the remotely stored content that is relied upon to generate a graphical representation of the sender's availability.

Figure 24:
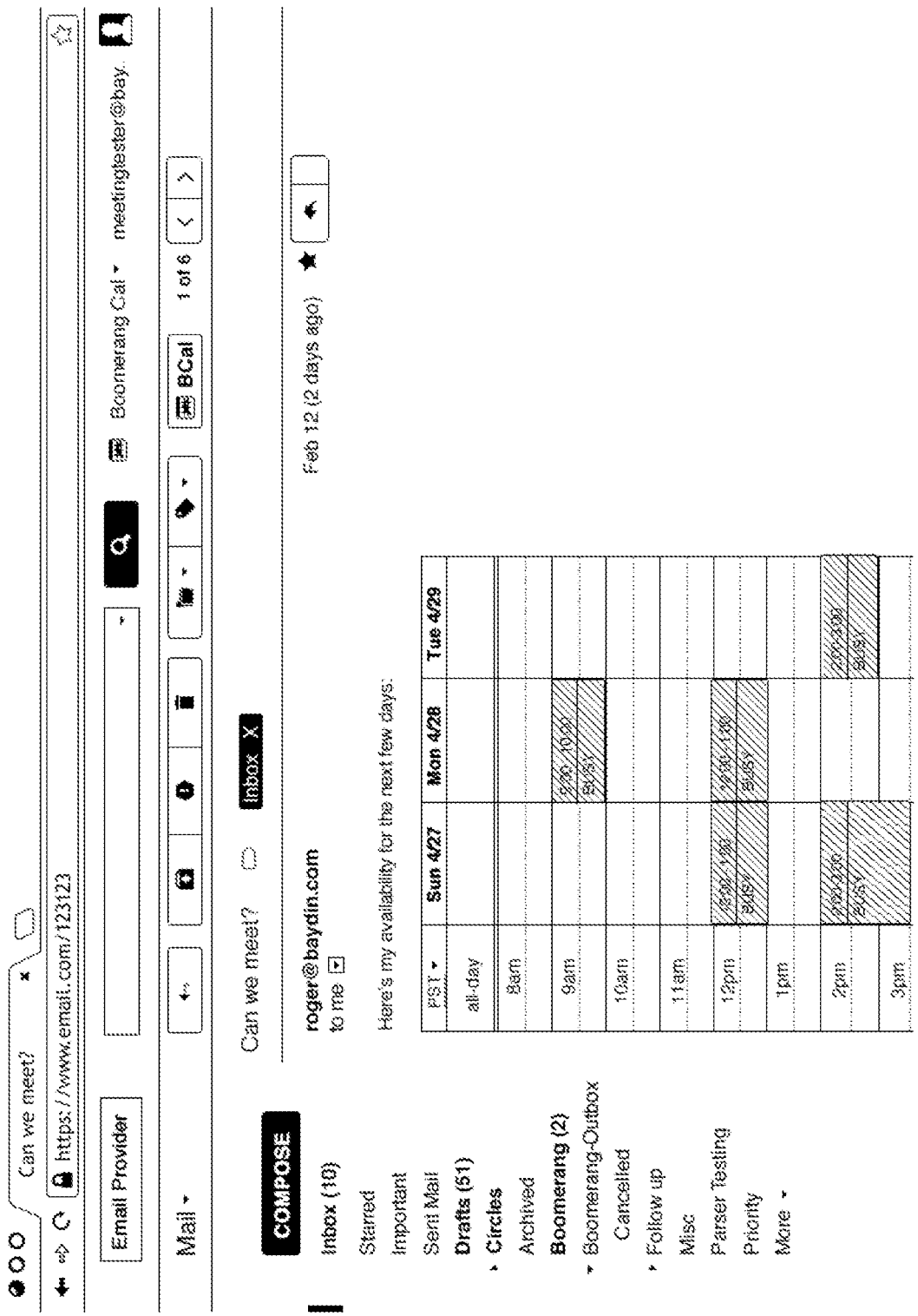
FIG. 24 is an exemplary user interface demonstrating the incorporation of calendar functionality into an electronic message.

In reference now to FIG. 24, an exemplary embodiment for further incorporating calendar functionality into e-mail is depicted. As demonstrated in FIG. 24 the graphical representation of a sender's availability in the electronic message received by the recipient may be dynamically updated to reflect changes to calendar entries in the sender's calendar. For example, comparing FIG. 24 to FIG. 23, one can see that the sender has become unavailable after 2:00 PM on Sunday. In some embodiments, this dynamic updating is achieved by the fact that the electronic message contains a reference to remotely stored content that is relied upon to generate the graphical representation of the sender's availability and which is updated as the sender's availability changes. For example, an HTML-based reference included in the electronic message to remotely stored content (such as one or more images reflecting the senders availability) may allow changing images to be displayed to the recipient when an electronic message is reopened or refreshed.

In some embodiments, an alert may be provided to the recipient while the e-mail is open indicating that the organizer's availability has changed and suggesting that the recipient refresh or re-open the e-mail in order to view the updated availability. In some embodiments, an alert may be provided to the recipient that the organizer's availability or tentative selection of time periods for a new calendar entry has changed followed by an automatic update to the c-mail. In some embodiments, no alert may be provided and the recipient's display of information relating to the organizer's selection of tentative time periods and/or the organizer's general availability may be automatically updated.

In some embodiments, the system may cache content from a prior display of a graphical representation of a user's availability (such as that displayed in FIG. 23) so as to minimize the time necessary to load new content for an updated graphical representation of a user's availability as demonstrated in FIG. 24. For example, in some embodiments, the system may cache a previously-generated copy of the content where said content may be an image and may set said image as the background of a new image so that loading time is minimal.

Figure 25:
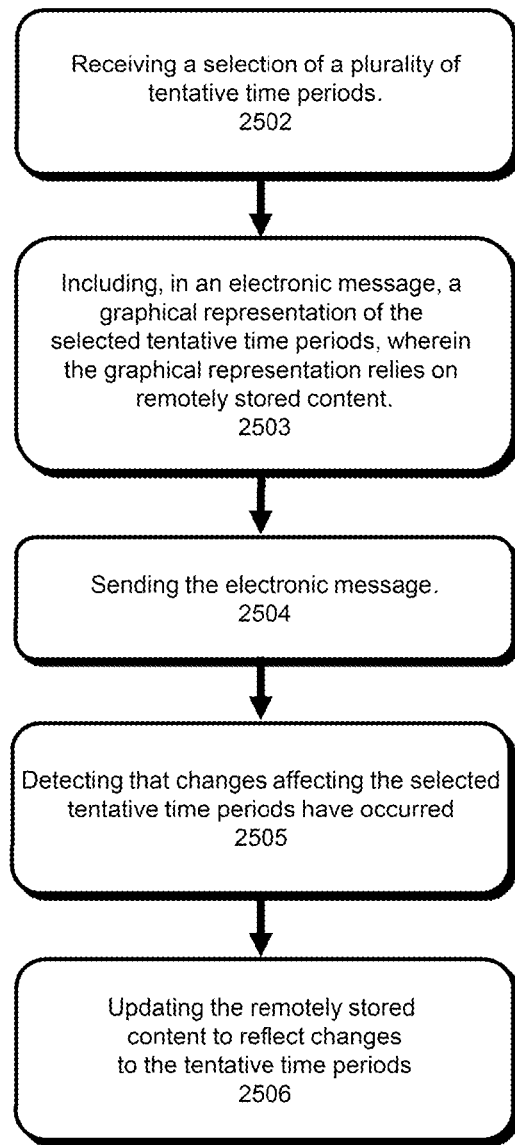
FIG. 25 is a flow diagram demonstrating an exemplary method for providing a graphical representations of calendar availability to a user.

In reference now to FIG. 25, a method for incorporating calendar functionality into an electronic message is depicted. A user, who may be referred to as an organizer, may select a plurality of tentative time periods. The selection of a plurality of tentative time periods may be received 2502 by the system. A graphical representation of the selected tentative time periods may be included 2503 in an electronic message. The graphical representation may rely on remotely stored content that is not itself stored in the electronic message. The electronic message may be sent 2504 to one or more recipients. Changes that affect the selected tentative time periods may then be detected 2505 by the system. Remotely stored content that is relied upon by the graphical representations may then be updated 2506 to reflect changes to the tentative time periods. The graphical representations in the electronic messages will then reflect this updated remotely stored content when those messages are subsequently opened or refreshed. One or more recipients may also confirm one or more of the tentative time periods by, for example, clicking or tapping on a portion of the graphical representation that is associated with the tentative time period that said recipient desires to confirm.

In some embodiments, the system may detect changes that affect selected tentative time periods by monitoring an organizer, or other users', calendar information. In some embodiments, the system may detect changes that affect selected tentative time periods by receiving information indicative of such changes. In some embodiments, the system may detect changes that affect selected tentative time periods by receiving information from an organizer, or other users', calendar system. In some embodiments, the system may detect changes that affect selected tentative time periods by receiving calendar information. In some embodiments, the system may detect changes that affect selected tentative time periods by receiving a request to make a change that affects the previously selected tentative time periods. In some embodiments, the system may detect changes that affect selected tentative time periods by making a request to an organizer, or other users', calendar system.

Figure 26:
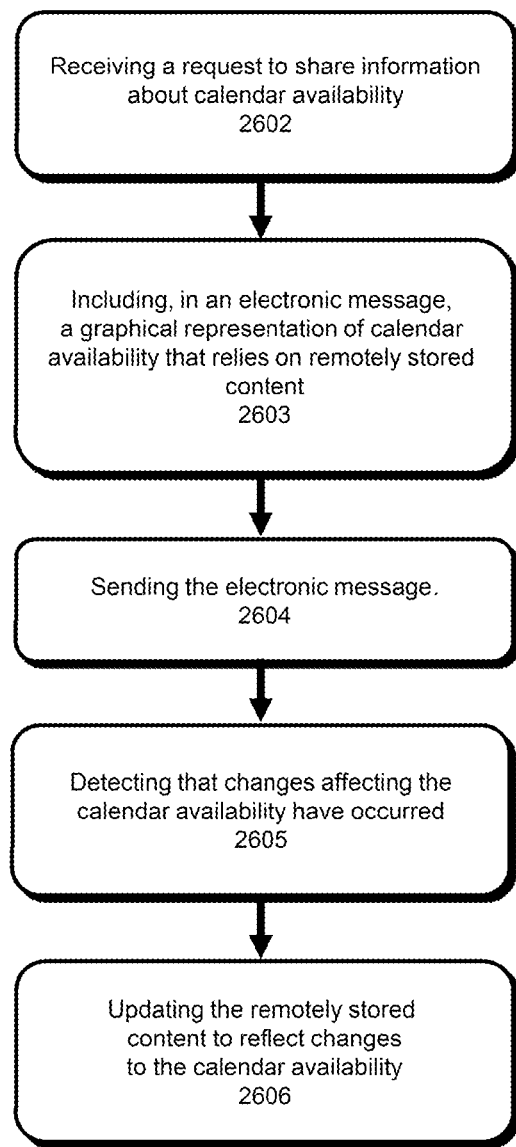
FIG. 26 is a flow diagram demonstrating an exemplary method for dynamically updating shared calendar availability.

In reference now to FIG. 26, a method for incorporating calendar functionality into an electronic message is depicted. A user, who may be referred to as an organizer, may request to share information about calendar availability. The request to share information about calendar availability may be received 2602 by the system. A graphical representation of the user's calendar availability may be included 2603 in an electronic message. The graphical representation may rely on remotely stored content that is not itself stored in the electronic message. The electronic message may be sent 2604 to one or more recipients. Changes that affect the users calendar availability may then be detected 2505 by the system. Remotely stored content that is relied upon by the graphical representations may then be updated 2506 to reflect changes to the user's calendar availability. The graphical representations in the electronic messages will then reflect this updated remotely stored content when those messages are subsequently opened or refreshed.

In some embodiments, the system may detect changes that affect a user's calendar availability by monitoring an organizer, or other users', calendar information. In some embodiments, the system may detect changes that affect a user's calendar availability by receiving information indicative of such changes. In some embodiments, the system may detect changes that affect a user's calendar availability by receiving information from an organizer, or other users', calendar system. In some embodiments, the system may detect changes that affect a user's calendar availability by receiving calendar information. In some embodiments, the system may detect changes that affect a user's calendar availability by receiving a request to make a change that affects the previously selected tentative time periods. In some embodiments, the system may detect changes that affect a user's calendar availability by making a request to an organizer, or other users', calendar system.

It is understood by those skilled in the art that, unless expressly required, the steps of the various methods described herein need not be performed in any particular order.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program", "software", or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
one or more processors, coupled with memory, configured to:
obtain, via a first client device associated with a first user that organizes a first calendar event, a selection of a set of candidate times for the first calendar event;
generate an electronic message comprising a graphical representation of first calendar availability of the first user for the set of candidate times;
send the electronic message to a set of client devices respectively associated with a set of users invited to the first calendar event, wherein the electronic message comprises computer-executable instructions including a reference to the graphical representation and that causes the set of client devices to present, via respective graphical user interfaces within the electronic message, a request for availability information of a corresponding user from the set of users for the set of candidate times; and
responsive to receipt, from a second client device of the set of client devices, associated with a second user of the set of users, of second calendar availability of the second user for one or more of the set of candidate times, generate an updated graphical representation comprising the first calendar availability of the first user and the second calendar availability of the second user, wherein the electronic message is updated to include the updated graphical representation.

2. The system of claim 1, wherein the one or more processors are configured to:
send the updated graphical representation comprising the first calendar availability of the first user and the second calendar availability of the second user to the set of client devices.

3. The system of claim 1, wherein the one or more processors are configured to:
select a candidate time for the first calendar event based on the first calendar availability of the first user and the second calendar availability of the second user.

4. The system of claim 1, wherein the one or more processors are configured to:
responsive to a selection of an element included within the electronic message comprising the updated graphical representation via the first client device, add the first calendar event to a first calendar associated with the first client device.

5. The system of claim 4, wherein the electronic message comprises a first electronic message, selection of the element causes the one or more processors to:
prefill a second electronic message with confirmation details related to a selected candidate time of the set of candidate times; and
provide the second electronic message to at least one of the set of client devices.

6. The system of claim 1, wherein the set of candidate times include a set of dates and times for the first calendar event, and wherein the request for availability information includes selectable radio buttons associated with one or more dates and times from the set of dates and times for the first calendar event.

7. The system of claim 6, wherein the second client device provides the second calendar availability by selecting selection of one or more of the selectable radio buttons corresponding to the one or more of the set of candidate times that the second user of the set of users is available for the first calendar event.

8. The system of claim 1, wherein the updated graphical representation being generated comprises the one or more processors being configured to:
receive, from a third client device of the set of client devices, associated with a third user of the set of users, third calendar availability of the third user for at least one of the one or more of the set of candidate times, the updated graphical representation comprising the first calendar availability, the second calendar availability, and the third calendar availability.

9. The system of claim 8, wherein the one or more processors are configured to:
select, based on the first calendar availability, the second calendar availability, and the third calendar availability that indicate that the first user, the second user, and the third user are available at a first candidate time of the set of candidate times, the first candidate time for the first calendar event.

10. The system of claim 1, wherein the one or more processors being configured to:
responsive to receipt, from a third client device of the set of client devices, associated with a third user of the set of users, of third calendar availability of the third user for one or more of the set of candidate times, generate an updated graphical representation comprising the first calendar availability of the first user, the second calendar availability of the second user, and the third calendar availability of the third user;
determine, based on the first calendar availability of the first user, the second calendar availability of the second user, and the third calendar availability of the third user, that the second user and the third user fail to include at least one overlap in availability; and
select, based on the second user and the third user, a candidate time of the set of candidate times that the first user and the third user are available for the first calendar event.

11. The system of claim 1, wherein the updated graphical representation being generated comprises the one or more processors being configured to:
embed a reference in the electronic message comprising the updated graphical representation such that the updated graphical representation is able to be changed without content included within the electronic message being changed.

12. The system of claim 1, wherein the one or more processors are configured to:
responsive to a determination that natural language included within a draft of the electronic message indicates that calendar availability information for the first user is to be retrieved, retrieve the first calendar availability of the first user for the set of candidate times.

13. A method, implemented using one or more processors of a computing system, comprising:
obtaining, via a first client device associated with a first user, a selection of a set of candidate times for a calendar event;
generating an electronic message comprising a graphical representation of first calendar availability of the first user for the set of candidate times;
sending, to a set of client devices respectively associated with a set of users invited to the calendar event, the electronic message to obtain availability information of the set of users for the set of candidate times, wherein the electronic message comprises computer-executable instructions including a reference to the graphical representation and causing the set of client devices to present, via respective graphical user interfaces within the electronic message, a request for the availability information;

receiving, from a second client device of the set of client devices, associated with a second user of the set of users, second calendar availability of the second user for one or more of the set of candidate times; and generating, as an update to the electronic message, an updated graphical representation comprising the first calendar availability of the first user and the second calendar availability of the second user.

14. The method of claim 13, wherein generating the updated graphical representation comprises:
generating an updated electronic message comprising the updated graphical representation.

15. The method of claim 13, wherein sending the electronic message to obtain the availability information of the set of users for the set of candidate times comprises:
submitting, to the set of client devices, a request for calendar availability of the set of users for the set of candidate times.

16. The method of claim 13, comprising:
sending the updated graphical representation comprising the first calendar availability of the first user and the second calendar availability of the second user to the set of client devices.

17. The method of claim 13, comprising:
selecting a candidate time for the calendar event based on the first calendar availability of the first user and the second calendar availability of the second user.

18. The method of claim 13, comprising:
determining that an element included within the electronic message was selected; and
adding the calendar event to a calendar associated with the first client device based on the element being selected.

19. The method of claim 13, comprising:
receiving, from a third client device of the set of client devices, associated with a third user of the set of users, third calendar availability of the third user for one or more of the set of candidate times;

generating an updated graphical representation comprising the first calendar availability of the first user, the second calendar availability of the second user, and the third calendar availability of the third user; and selecting, based on the first calendar availability of the first user, the second calendar availability of the second user, and the third calendar availability of the third user, a candidate time of the set of candidate times that the first user and the third user are available for the calendar event.

20. One or more non-transitory computer-readable media storing computer program instructions that, when executed by one or more processors, effectuate operations comprising:

obtaining, via a first client device associated with a first user, a selection of a set of candidate times for a calendar event;

generating an electronic message comprising a graphical representation of first calendar availability of the first user for the set of candidate times;

sending, to a set of client devices respectively associated with a set of users invited to the calendar event, the electronic message to obtain availability information of the set of users for the set of candidate times, wherein the electronic message comprises computer-executable instructions including a reference to the graphical representation and causing the set of client devices to present, via respective graphical user interfaces within the electronic message, a request for the availability information; and responsive to receiving, from a second client device of the set of client devices, associated with a second user of the set of users, second calendar availability of the second user for one or more of the set of candidate times, generating, as an update to the electronic message, an updated graphical representation comprising the first calendar availability of the first user and the second calendar availability of the second user.

21. The system of claim 1, wherein at least one of the respective graphical user interfaces within the electronic message comprises an image map overlap or a link to the first calendar availability of the first user.

\* \* \* \* \*